US012561889B2

(12) United States Patent
Westby et al.

(10) Patent No.: US 12,561,889 B2
(45) Date of Patent: Feb. 24, 2026

(54) GRAPHICS PROCESSING USING RAY TRACE UNIT TRIANGLE STRIP DATA STRUCTURE

(71) Applicant: Arm Limited, Cambridge (GB)

(72) Inventors: Alexander James Westby, Cambridge (GB); Richard Edward Bruce, Great Shelford (GB)

(73) Assignee: Arm Limited, Cambridge (GB)

( * ) Notice: Subject to any disclaimer, the term of this patent is extended or adjusted under 35 U.S.C. 154(b) by 232 days.

(21) Appl. No.: 18/356,194

(22) Filed: Jul. 20, 2023

(65) Prior Publication Data

US 2025/0029314 A1      Jan. 23, 2025

(51) Int. Cl.
*G06T 1/20*          (2006.01)
*G06T 1/60*          (2006.01)
*G06T 15/06*         (2011.01)
*G06T 17/10*         (2006.01)

(52) U.S. Cl.
CPC ................ *G06T 15/06* (2013.01); *G06T 1/20* (2013.01); *G06T 17/10* (2013.01); *G06T 1/60* (2013.01); *G06T 2200/28* (2013.01)

(58) Field of Classification Search
CPC .. G06T 1/20; G06T 1/60; G06T 15/06; G06T 17/10; G06T 2200/28

USPC ......................................... 345/418, 503, 531
See application file for complete search history.

(56)                References Cited

U.S. PATENT DOCUMENTS

| | | | | |
|---|---|---|---|---|
| 2008/0192050 | A1* | 8/2008 | Schardt | G06T 15/06 |
| | | | | 345/421 |
| 2019/0318445 | A1* | 10/2019 | Benthin | G06T 15/005 |
| 2021/0390759 | A1* | 12/2021 | Muthler | G06T 17/10 |

* cited by examiner

*Primary Examiner* — Jacinta M Crawford
(74) *Attorney, Agent, or Firm* — Pearl Cohen Zedek Latzer Baratz LLP

(57)                ABSTRACT

A system for storing geometry data for use by a graphics processor when rendering a frame that represents a view of a scene using a ray tracing process. The system comprises a processing circuit that is configured to prepare a ray tracing acceleration data structure for use when rendering a frame that represents a view of a scene using a ray tracing process. Graphics primitives for an end point of the ray tracing acceleration data structure is sorted into groups of contiguous graphics primitives, and fewer instances of vertex data is stored for a graphics primitive that is shared by at least two graphics primitives of the group of contiguous graphics primitives than the number of graphics primitives in the group of contiguous graphics primitives that share the vertex.

17 Claims, 14 Drawing Sheets

| Line Number (32 bit lines) | value |
|---|---|
| 0 | tri_0_vertex_0_x |
| 1 | tri_0_vertex_0_y |
| 2 | tri_0_vertex_0_z |
| 3 | tri_0_1_vertex_1_x |
| 4 | tri_0_1_vertex_1_y |
| 5 | tri_0_1_vertex_1_z |
| 6 | tri_0_1_2vertex_2_x |
| 7 | tri_0_1_2_vertex_2_y |
| 8 | tri_0_1_2vertex_2_z |
| 9 | tri_1_2_vertex_0_x |
| 10 | tri_1_2_vertex_0_y |
| 11 | tri_1_2_vertex_0_z |
| 12 | tri_2_vertex_1_x |
| 13 | tri_2_vertex_1_y |
| 14 | tri_2_vertex_1_z |
| 15 | Reserved(2 bits), isValid1(1 bit), isValid2(1 bit), isValid3(1 bit), isOpaque1(1 bit), isOpaque2(1 bit), isOpaque3,(1 bit), geometry_id(24 bits) |

110

112

114

115

111        113

GRAPHICS PROCESSING USING RAY TRACE UNIT TRIANGLE STRIP DATA STRUCTURE

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value for a sampling position in the image (plane), is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation.

The Applicants believe that there remains scope for improved techniques for performing ray tracing using a graphics processor.

BRIEF DESCRIPTION OF DRAWINGS

Embodiments of the technology described herein will now be described by way of example only and with reference to the accompanying drawings, in which.

Like reference numerals are used for like elements in the Figures where appropriate.

DETAILED DESCRIPTION

Figure 1:
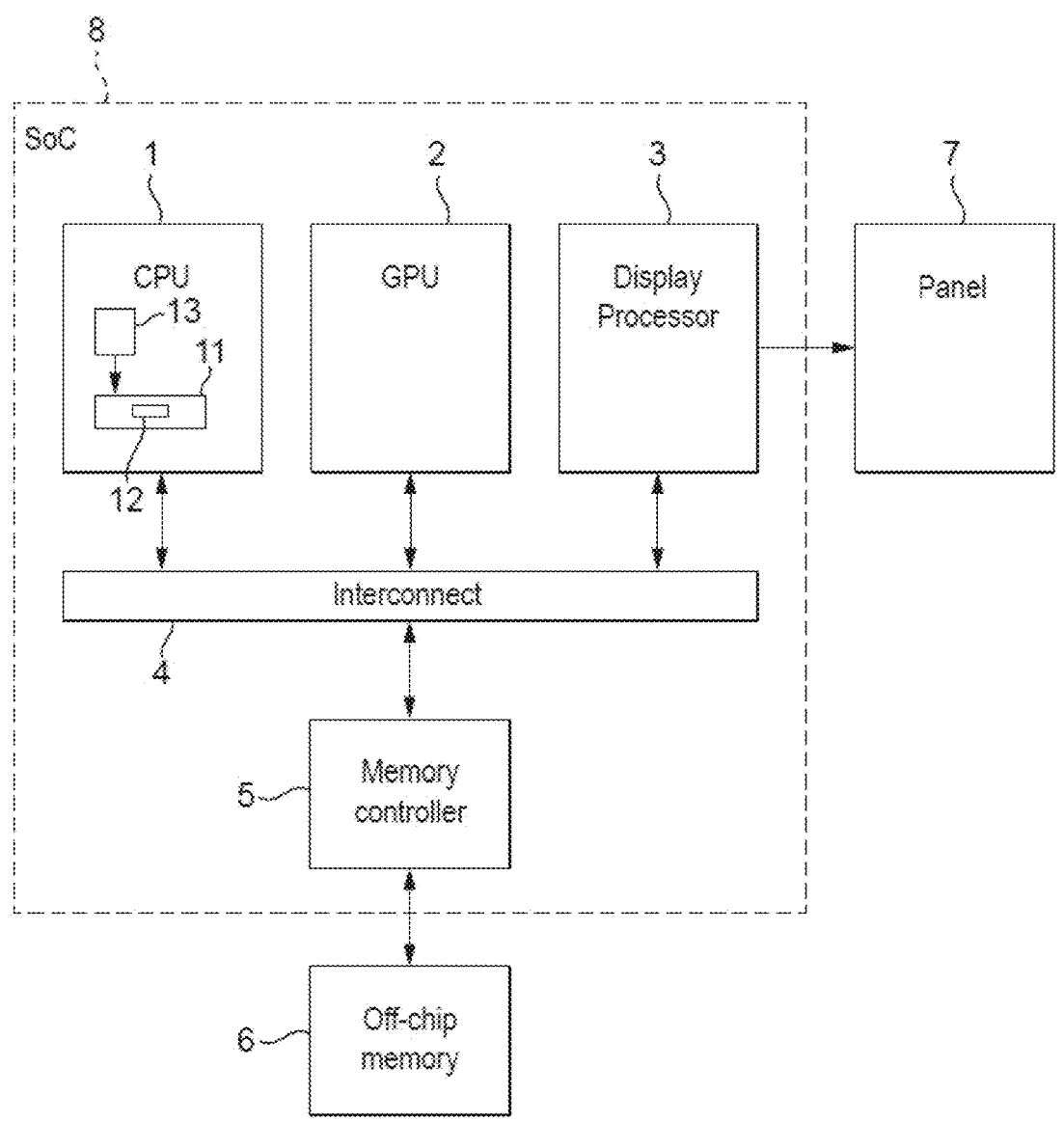
FIG. 1 shows an exemplary graphics processing system.

A first embodiment of the technology described herein comprises a method of storing geometry data for use by a graphics processor when rendering a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

the method comprising, when preparing a ray tracing acceleration data structure for use when rendering a frame that represents a view of a scene using a ray tracing process:

for a set of graphics primitives that an end point of the ray tracing acceleration structure represents:

storing vertex data for the set of graphics primitives for the end point, wherein storing vertex data for the set of graphics primitives for the end point comprises:

sorting the set of graphics primitives that the end point represents into zero or more groups of contiguous graphics primitives; and where the set of graphics primitives for the end point has been sorted into one or more groups of contiguous graphics primitives, for a vertex of a group of contiguous graphics primitives that is shared by at least two graphics primitives of the group of contiguous graphics primitives, storing fewer instances of the vertex data for the shared vertex than the number of graphics primitives in the group of contiguous graphics primitives that share the vertex.

A second embodiment of the technology described herein comprises a system for storing geometry data for use by a graphics processor when rendering a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

the system comprising a processing circuit that is configured to when preparing a ray tracing acceleration data structure for use when rendering a frame that represents a view of a scene using a ray tracing process:

for a set of graphics primitives that an end point of the ray tracing acceleration structure represents:

store vertex data for the set of graphics primitives for the end point;

wherein the processing circuit is configured to, when storing vertex data for a set of graphics primitives for an end point:

sort the set of graphics primitives that the end point represents into zero or more groups of contiguous graphics primitives; and where the set of graphics primitives for the end point has been sorted into one or more groups of contiguous graphics primitives, for a vertex of a group of contiguous graphics primitives that is shared by at least two graphics primitives of the group of contiguous graphics primitives, store fewer instances of the vertex data for the shared vertex than the number of graphics primitives in the group of contiguous graphics primitives that share the vertex.

The technology described herein broadly relates to the performing of ray tracing on a graphics processor in order to render a frame that represents a view of a particular scene. When performing a ray tracing operation, for each ray that is being used to render a sampling position in the frame that is being rendered, in order to render the sampling position, it first needs to be determined which geometry that is defined for the scene is intersected by the ray (if any).

There are various ways in which this can be done, as desired. However, in general, there may be many millions of graphics primitives within a given scene, and millions of rays to be tested, such that it is not normally practical to test every ray against each and every graphics primitive. To speed up the ray tracing operation the technology described herein therefore uses a ray tracing acceleration data structure, such as a bounding volume hierarchy (BVH), that is representative of the distribution of the geometry in the scene that is to be rendered to determine the intersection of rays with geometry (e.g. objects) in the scene being rendered (and then renders sampling positions in the output rendered frame representing the scene accordingly).

The ray tracing operation therefore generally comprises performing a traversal of a ray tracing acceleration data structure for a plurality of rays that are being used for the ray tracing process. In an embodiment, the traversal involves testing the rays for intersection with the volumes represented by different elements (e.g. nodes) of the ray tracing acceleration data structure in order to determine with reference to the, e.g. node, volumes which geometry may be intersected by which rays for a sampling position in a frame for a scene that is being rendered, and which geometry therefore needs to be further processed for the rays for the sampling position.

The use of such ray tracing acceleration data structures can therefore be effective in speeding up the overall ray tracing operation.

However, the Applicants have recognised that there is still scope for improvement in this regard.

In particular, the technology described herein recognises that loading in the required data for performing ray-primitive intersections during the ray tracing process can involve relatively high memory bandwidth. Furthermore, the ray tracing acceleration data structure may take up a large amount of memory space.

The technology described herein therefore aims to reduce these requirements when performing ray tracing using a ray tracing acceleration data structure.

This is achieved in the technology described herein by providing more efficient storage for graphics primitives for end points of a ray tracing acceleration data structure.

In particular, the technology described herein recognises that graphics primitives to be stored may often share at least one vertex with another graphics primitive to be stored, and that such graphics primitives may be stored more efficiently by storing fewer instances of the vertex data for the shared vertex than the number of graphics primitives that share the vertex, rather than, for example, storing a separate instance of the vertex data for the shared vertex for each graphics primitive that shares the vertex. In other words, a shared instance of the vertex data is stored for the (same, single) shared vertex which shared instance can then be (and is) used for the subsequent processing of the multiple graphics primitives that share the vertex.

The technology described herein facilitates the storage of vertex data in this manner (where possible) by sorting sets of graphics primitives for end points of the ray tracing acceleration data structure into groups of contiguous graphics primitives (where each graphics primitive in a group of contiguous graphics primitives shares at least one vertex with at least one other graphics primitive in the group of contiguous graphics primitives).

This allows groups of contiguous graphics primitives among the graphics primitives for an end point to be identified, such that the vertex data for those graphics primitives can then be stored in the more efficient manner of the technology described herein.

In this way, the technology described herein can reduce the amount of data that is stored for each end point of a ray tracing acceleration data structure and, as such, reduces the amount of data that must be fetched when performing ray tracing using the ray tracing acceleration data structure.

The ray tracing operation is performed using a ray tracing acceleration data structure. The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure includes at least some end points representing sets of graphics primitives defined for the scene that occupy a volume within the scene that the end point corresponds to.

In an embodiment, the ray tracing acceleration data structure represents (a plurality of) respective volumes within the scene being rendered and indicates and/or can be used to determine geometry for the scene to be rendered that is present in those volumes.

More in an embodiment, the ray tracing acceleration data structure(s) comprises a plurality of nodes, each node associated with a respective one or more volumes within the scene. In an embodiment, at least some of the nodes of the ray tracing acceleration data structure comprise end (e.g. leaf) nodes that represent sets of graphics primitives defined for the scene that occupy the volume within the scene that the end (e.g. leaf) node corresponds to (and that accordingly will be the endpoints of the ray tracing acceleration data structure that will be handled in in the manner of the technology described herein).

More in an embodiment, the ray tracing acceleration data structure(s) comprise a tree structure, such as a bounding volume hierarchy (BVH) tree. The bounding volumes may be axis aligned (cuboid) volumes. Thus, in one embodiment, the ray tracing acceleration data structure comprises a bounding volume hierarchy, and in an embodiment a BVH tree.

The BVH is a tree structure with primitives (which may be triangles, or other suitable geometric objects) at (at least some of) the end (leaf) nodes (end points). Primitives at the end (leaf) nodes are wrapped in bounding volumes. In an embodiment the bounding volumes are axis aligned bounding boxes. The bounding volumes are then recursively clustered and wrapped in bounding volumes until a single root node is reached. At each level of the recursion two or more bounding volumes may be clustered into a single parent bounding volume. For instance, and in an embodiment, each non-end (non-leaf) node has a corresponding plurality of child nodes.

In an embodiment the ray tracing acceleration data structure used in the technology described herein comprises a 'wide' tree structure, in which each parent node may be (and in an embodiment is) associated with greater than two child nodes, such as three, four, five, six, or more, child nodes. In an embodiments each parent node may be associated with up to six child nodes. In that case, each instance of ray-volume intersection testing in an embodiment comprises testing one or more rays against each of the plural child nodes.

However, other suitable ray tracing acceleration data structures may also be used, as desired. For instance, rather than using a BVH hierarchy, where the scene is subdivided by volume on a per-object basis, e.g. by drawing suitable bounding volumes around subsets of geometry, e.g., and in an embodiment, such that each leaf node (volume) corresponds to a certain number of objects (primitives), the scene could instead be subdivided on a per-volume basis, e.g. into substantially equally sized sub-volumes. For example, the ray tracing acceleration data structure may comprise a k-d tree structure, a voxel (grid hierarchy), etc., as desired. It would also be possible to use 'hybrid' ray tracing acceleration data structures where the scene is subdivided in part on a per-object basis and in part on a per-volume basis. Various other arrangements would be possible and the technology described herein may in general be used with any suitable ray tracing acceleration data structure.

Subject to the requirements of the technology described herein, the ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered.

It could also or instead be generated by a CPU (e.g. host processor), e.g. based on an indication of geometry for the scene, e.g. in a preliminary processing pass before the scene is rendered.

Other arrangements would, of course, be possible.

Subject to the requirements of the technology described herein the ray tracing acceleration data structure can represent and be indicative of the distribution of geometry for a scene to be rendered in any suitable and desired manner. Thus it may represent the geometry in terms of individual graphics primitives, or sets of graphics primitives. In accordance with the technology described herein, at least some of the end points (nodes) of the ray tracing acceleration data structure represent a corresponding set of graphics primitives defined for the scene.

Additionally, the ray tracing acceleration data structure could indicate at least some of the geometry for the scene in the form of higher level representations (descriptions) of the geometry, for example in terms of models or objects comprising plural primitives. As such, and in an embodiment, some (other) end points (e.g. leaf nodes) of the ray tracing data structure may indicate a higher level representation of the geometry that occupies the volume that the end point (e.g. leaf node) corresponds to.

It would also be possible for a given ray tracing acceleration data structure to indicate further ray tracing acceleration data structures that need to be analysed. In this case, an initial ray tracing acceleration data structure would, for example, indicate further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects. Some end points (nodes) of such a ray tracing acceleration data structure may therefore indicate a transition to a further ray tracing acceleration data structure to be traversed.

In such a case, at least some of the end points (e.g. leaf nodes) of the given ray tracing acceleration data structure, and/or of a further ray tracing data structure (in an embodiment) comprise a corresponding set of graphics primitives defined for the scene that occupy a volume that the end point represents, and the technology described herein extends to the storage of such end points (e.g. leaf nodes).

Thus the ray tracing traversal operation could include transitions between different ray tracing acceleration data structures, such as transitions between different levels of detail (LOD), and/or between different levels of multi-level ray tracing acceleration data structures.

There may also be ray transformations when transitioning between different ray tracing acceleration data structures (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays.

Other arrangements would, of course, be possible.

The ray tracing acceleration data structure includes at least some end points (e.g. leaf nodes) that represent sets of graphics primitives defined for the scene.

The sets of graphics primitives that end points of the ray tracing acceleration data structure are to represent may be identified in any suitable and desired way, for example and in an embodiment in the usual way for the ray tracing system in question.

In an embodiment, graphics primitives for the scene are prepared for the scene in the usual way for the graphics processing system.

The graphics primitives prepared for the scene may then be sorted into one or more ray tracing data structures. Sets of graphics primitives that end points of the ray tracing acceleration data structure represent may then be identified in any suitable and desired way.

In an embodiment, sets of graphics primitives that an end point of a ray tracing acceleration data structure represents are identified by determining graphics primitives that occupy a volume that the end point of the ray tracing acceleration data structure corresponds to.

In some embodiments, a volume within the scene is defined for a (and in an embodiment each) end point of the ray tracing acceleration data structure. For example, and in an embodiment, the scene may be divided into one or more regularly sized volumes that correspond to one or more end points. Any graphics primitives for the scene that occupy a volume may be included in the set of graphics primitives for the respective end point that corresponds to that volume.

In other embodiments, the volume within a scene that an end point corresponds to may not be defined in advance, but may instead be determined as part of the sorting of the graphics primitives into the ray tracing acceleration data structure. For example, and in an embodiment, graphics primitives to be included in a set of graphics primitives that an end point represents may be identified according to any suitable and desired criteria, such as, for example, by allocating a particular (e.g. pre-determined) number of graphics primitives to each end point. A volume that the set of graphics primitives occupies may then be identified as the volume that the end point corresponds to.

Other arrangements would, of course, be possible.

In embodiments, once a set of graphics primitives that an end point(s) of a ray tracing acceleration data structure represents has been identified (and more in an embodiment, once a set of graphics primitives has been identified for each end point), vertex data for set(s) of graphics primitives for a (and more in an embodiment each) end point of the ray tracing acceleration data structure is subsequently stored in the manner of the technology described herein.

Particularly, in accordance with the technology described herein, storing a set of graphics primitives for an end point of a ray tracing acceleration data structure comprises sorting the set of graphics primitives for the end point of the ray tracing acceleration data structure into zero or more groups of contiguous graphics primitives.

As referred to herein, a graphics primitive is considered to be contiguous with another graphics primitive if it shares a (at least one) vertex with that another graphics primitive.

In the technology described herein, contiguous graphics primitives are identified and grouped for a set of graphics primitives for an end point, allowing the vertex data for the contiguous graphics primitives to be more efficiently stored, as will be discussed further below.

Graphics primitives may be grouped in a group of contiguous graphics primitives in any suitable and desired manner.

In an embodiment, a first unallocated (i.e. not currently allocated to a group of contiguous graphics primitive) graphics primitive of a set of graphics primitives is selected. This first graphics primitive is then tested to determine whether there is a second unallocated graphics primitive of the set of graphics primitives that is contiguous with the first graphics primitive. If such a second graphics primitive is identified, this second graphics primitive, along with the first graphics primitive, is allocated to (start) a group of contiguous graphics primitives.

In an embodiment, once a second graphics primitive has been identified, that second graphics primitive is then tested to determine whether there is a third (i.e. another graphics primitive that is not the first graphics primitive) unallocated graphics primitive of the set of graphics primitives that is contiguous with the second graphics primitive, and if so, this third graphics primitive is also allocated to the group of contiguous graphics primitives.

In an embodiment, this process is repeated such that when an unallocated graphics primitive of the set of graphics primitives is identified as being contiguous with a graphics primitive of the set of graphics primitives most recently added to the group of contiguous graphics primitives, that new unallocated graphics primitive is then allocated to the group of contiguous graphics primitives and is tested to determine whether there is a further (i.e. not already in the group of contiguous graphics primitives) unallocated graphics primitive that is contiguous with that latest graphics primitive (to be added to the group).

In an embodiment, this process is continued until it is found (determined) that there aren't any unallocated graphics primitives that are contiguous with the latest (most recent) graphics primitive added to the group.

It will be appreciated that in this way, unallocated graphics primitives of the set of graphics primitives are allocated to the group one-by-one in succession, to form a "strip" of graphics primitives, where (only) a single further (i.e. not already in the group of contiguous graphics primitives) contiguous graphics primitive is identified for each new graphics primitive added to the strip (even if the new graphics primitive is contiguous with more than one further graphics primitive). Sorting graphics primitives into strips in this manner may be computationally simpler and may facilitate easier storage of graphics primitives in the manner of the technology described herein.

In some embodiments, when a (latest) graphics primitive is reached that is determined to not be contiguous with any further unallocated graphics primitives of the set of graphics primitives, the first graphics primitive may be tested to determine whether there is another unallocated graphics primitive (that is not the second graphics primitive) of the set of graphics primitives that is contiguous with the first graphics primitive. If so, this another graphics primitive is also allocated to the group of contiguous graphics primitives, and the process is continued from this another graphics primitive (to thereby, in effect, start a further "strip" of contiguous graphics primitives).

It would instead be possible to attempt to identify all of the (unallocated) graphics primitives of the set of graphics primitives that are contiguous with a (and each) graphics primitive included in the group of graphics primitives, and in another embodiment this is what is done. In this way, more graphics primitives may be added to the group of graphics primitives, which may allow for a greater reduction in the space required to store the graphics primitives in the manner of the technology described herein.

Whilst graphics primitives may be (and in an embodiment are) considered to be contiguous for the purposes of the technology described herein if they share only a single vertex, in embodiments, graphics primitives are considered to be contiguous if (when) they share an edge (and therefore at least two vertices) with another graphics primitive.

Thus, in embodiments, graphics primitives are only allocated to a group of contiguous graphics primitives if (when) they share an edge (and therefore at least two vertices) with another graphics primitive (of a group of contiguous graphics primitives (and more in an embodiment a graphics primitive most recently added to the group of graphics primitives, as described above)).

In some embodiments, graphics primitives of a set of graphics primitives for an end point of a ray tracing acceleration data structure are allocated to a group of contiguous graphics primitives until no further graphics primitives can be allocated to the group of contiguous graphics primitives, for example when a new graphics primitive is reached that is determined to not be contiguous with any further unallocated graphics primitives of the set of graphics primitives as described above, or once there are no unallocated graphics primitives remaining in the set of graphics primitives for the end point.

However, in some embodiments there may be one or more further conditions for finishing allocating graphics primitives to a group of contiguous graphics primitives, such that when said condition is met then no further graphics primitives are added to the group of contiguous graphics primitives, even if there are further graphics primitives in the set of graphics primitives for the end point that are contiguous with a graphics primitive most recently allocated to the group of contiguous graphics primitives.

The further condition(s) for finishing allocating graphics primitives to the group of contiguous graphics primitives can be any suitable further condition. For example, the further condition may be that a maximum number of graphics primitives have been allocated to the group of contiguous graphics primitives.

In an embodiment, if there are remaining unallocated graphics primitives in the set of graphics primitives once a group of contiguous graphics primitives has been finished, these remaining graphics primitives are in an embodiment (attempted to be) sorted into one or more further groups of contiguous graphics primitives. In an embodiment this is continued until all of the graphics primitives of the set of graphics primitive have been (attempted to be) sorted into groups of contiguous graphics primitives.

It will be appreciated that some graphics primitives of the set of graphics primitives may not be able to be sorted into a group of contiguous graphics primitives, for example graphics primitives that are not contiguous with any other graphics primitives of the set of graphics primitives.

In some embodiments, these graphics primitives may be allocated to one or more groups of non-contiguous primitives (where graphics primitives in a group of non-contiguous graphics primitives are not contiguous with any other graphics primitives in the group of non-contiguous graphics primitives). In other embodiments these graphics primitives may not be grouped at all (and as such may be subsequently stored as individual graphics primitives).

Accordingly, in an embodiment, sorting the set of graphics primitives for an end point into zero or more groups of contiguous graphics primitives comprises, for an unallocated first primitive of the set of graphics primitives:

determining whether there is an unallocated second graphics primitive of the set of graphics primitives that shares at least one vertex with the first graphics primitive, and if so, forming a group of contiguous graphics primitives comprising the first graphics primitive and the second graphics primitive.

In a particular embodiment, sorting the set of graphics primitives for an end point into groups of contiguous graphics primitives further comprises:

determining whether there is an unallocated third graphics primitives of the set of graphics primitives that shares a vertex with the second graphics primitive, and if so, allocating the third graphics primitive to the group of contiguous graphics primitives; and continuing to determine whether there is an unallocated next graphics primitive of the set of graphics primitives that shares a vertex with a graphics primitive most recently added to the group of contiguous graphics primitives, and if so, allocating the next graphics primitive to the group of contiguous graphics primitives.

Once the set of graphics primitives for the end point of the ray tracing acceleration data structure has been sorted into zero or more groups of contiguous graphics primitives, (at least) vertex data for the zero or more group(s) of contiguous graphics primitives are stored, in an embodiment in memory.

The vertex data may include attributes of the graphics primitives, such as their vertex positions, normals, surface type/materials, etc., This may be needed in order to determine the actual intersection (point), and for performing further processing in relation to a sampling position accordingly.

Most in an embodiment, the vertex data comprises vertex positions for the graphics primitives.

As discussed above, sorting graphics primitive for an end point (where possible) into groups of contiguous graphics primitives facilitates more efficient storage of the vertex data for the graphics primitives.

In particular, graphics primitives in a group of contiguous graphics primitives are contiguous with, and therefore share at least one vertex (and more in an embodiment at least one edge) with, at least one other graphics primitive in the group of contiguous graphics primitives (it will be appreciated however that this does not mean a graphics primitive must be contiguous with every other graphics primitive in the group of contiguous graphics primitives).

This allows fewer instances of the vertex data for a shared vertex to be stored (and this is what is done) for the group of contiguous graphics primitives. For example, and in an embodiment, where a vertex is common between two graphics primitives, only a single instance of the vertex data may be stored (which can subsequently be used for both of the graphics primitives that share the vertex, as will be discussed below), rather than storing an instance of the vertex data individually for each of the two graphics primitives.

In this way, the technology described herein allows fewer instances of vertex data to be stored, thereby reducing the amount of data that must be stored for a (and each) end point of a ray tracing acceleration data structure and, as such, allows the amount of data stored for the ray tracing acceleration data structure, and correspondingly the amount of data that must be fetched when performing ray tracing using the ray tracing acceleration data structure, to be reduced.

Subject to the constraints of the technology described herein, vertex data for the graphics primitives of the group of contiguous graphics primitives may be stored in any suitable and desired way.

For example, vertex data for graphics primitives for a (and each) group of graphics primitives may be allocated to available memory space without using a pre-defined, fixed, data structure, and in an embodiment this is what is done.

However, more in an embodiment, the graphics primitives for the end points of the ray tracing acceleration data structure are stored in one or more pre-defined data structures. Storing vertex data for graphics primitives in pre-defined data structures facilitates easier allocation of memory space for the graphics primitives.

The pre-defined data structure in an embodiment comprises a fixed layout for data to be stored in. In an embodiment, the pre-defined data structure comprises a plurality of entries for data to be stored in. In an embodiment, these entries have a particular configuration, such that a particular entry is (always) used to store the same (type of and/or instance of) data (in each different data structure).

For example, and in an embodiment, when the vertex data for a vertex of a graphics primitive to be stored in the data structure comprises vertex positions of the vertex, a particular vertex position of a particular vertex of a first graphics primitive to be stored in the data structure is (always) stored in a corresponding entry for this data.

In this way, the relevant entry (for example for a particular vertex position) may be easily identified when accessing the data from the data structure (by reading the appropriate entry (location) in the data structure).

In embodiments, the pre-defined data structure(s) are configured to store (have capacity to store) a particular, in an embodiment selected, in an embodiment predetermined, (maximum) number of graphics primitives. Thus, for example, and in an embodiment, the pre-defined data structures contain sufficient entries for vertex data for (only) a particular (maximum) number of graphics primitives.

In this case, the sorting of graphics primitives into groups of contiguous graphics primitives may be arranged such that only up to the particular (maximum) number of graphics primitives that a data structure can store are allocated to a (and each) group of contiguous graphics primitives (even if there are further contiguous graphics primitives that could be added to the group of contiguous graphics primitives).

In an embodiment, the number of graphics primitives in a (and each) group of contiguous graphics is not restricted. To allow such unrestricted groups of contiguous graphics primitives to then be stored in pre-defined data structures having a fixed (maximum) capacity, the groups of contiguous graphics primitives are in an embodiment then sub-divided as necessary into one or more subsets of contiguous graphics primitives, with each subset comprising (up to) a particular, maximum, number of contiguous graphics primitives that a data structure can store, i.e. such that a (and each) group of contiguous graphics primitives is stored in one data structure, or, if necessary, sub-divided and stored in plural of the data structures.

Accordingly, in an embodiment, storing a set of graphics primitives for an end point comprises, when a group of contiguous graphics primitives comprises more than a particular maximum number of graphics primitives: sub-dividing the group of contiguous graphics primitives into two or more subsets of contiguous graphics primitives comprising up to the particular maximum number of graphics primitives; and storing the subsets of contiguous graphics primitives in data structures configured to receive the particular maximum number of graphics primitives.

The maximum number of graphics primitives that the data structures are configured to receive, and therefore in the subsets that the group of contiguous graphics primitives are divided into, can be any suitable and desired number. For example, and in embodiments, the maximum number of graphics primitives is two, or three, or four, or up to ten, or any other suitable number.

The Applicants believe that having maximum numbers of two, three or four graphics primitives in a data structure (in the subsets of contiguous graphics primitives) may be particularly beneficial. Increasing the number of graphics primitives may increase the reduction in vertex data that must be stored, but the larger the maximum number of graphics primitives a data structure can store, the higher the chance data structures for storing the contiguous graphics primitives will be unfilled.

In one particular embodiment, the particular maximum number of graphics primitives is two. Storing two graphics primitives in a data structure may provide a relatively more efficient filling of data structures (i.e. may allow for a reduction in the number of partially filled data structures).

In another particular embodiment, the particular maximum number of graphics primitives is three. This may provide a greater reduction in the amount of vertex data that is stored but there may be more instances of partially filled data structures compared to embodiments where the particular maximum number of graphics primitives is two.

Accordingly, both of these embodiments have been found to work particularly well to provide an efficient balance between the above factors.

The Applicants have appreciated that the number of graphics primitives in a group of contiguous graphics primitives may not be an exact multiple of the maximum number of primitives that a (and each) data structure can store. As such, after sub-dividing a group of contiguous graphics primitives, at least one of the subsets of contiguous graphics primitives (and in an embodiment only one (the last one) of the subsets) may have a number of contiguous graphics primitives that is less than the maximum number of contiguous graphics primitives that a data structure can store. Such a subset with fewer than the maximum number of primitives may be stored in any suitable and desired way.

For example, additional data structures may be provided that are configured to store a smaller maximum number of graphics primitives, which may be used to store the smaller subset(s) accordingly, and in one embodiment that is what is done.

However, in an embodiment the vertex data for the graphics primitives is always stored in data structure(s) sized to fit the (same) maximum number of contiguous graphics primitives, even for single graphics primitives or subset(s) of contiguous graphics primitives that contain fewer graphics primitives than that maximum number of graphics primitives.

In such a case, subsets of contiguous graphics primitives may be stored in data structures configured in the same way, regardless of whether the subset contains the maximum number of graphics primitives that the data structures are configured to store. Accordingly, some of the data structures (in which fewer than the maximum number of graphics primitives are stored) may include space (e.g. entries) for vertex data for one or more graphics primitives that is left unfilled.

Storing each of the subsets of contiguous graphics primitives in data structures having the same size and configuration further simplifies the storage and allocation of memory space for graphics primitives.

Accordingly, in embodiments, vertex data for graphics primitives for an end point of a ray tracing acceleration data structure is stored in one or more (pre-defined) data structures, as described above. The end point of the ray tracing acceleration data structure therefore in an embodiment has associated with it a list of indications of the locations of each of the data structures that vertex data for graphics primitives for the end point are stored in. In an embodiment, the list of indications comprises a list of pointers to the locations of the data structures storing the vertex data for the end point.

In accordance with the technology described herein, where a set of graphics primitives for an end point of a ray tracing acceleration data structure has been sorted into one or more groups of contiguous graphics primitives, for a vertex of a group of contiguous graphics primitives that is shared by at least two graphics primitives of the group of contiguous graphics primitives, fewer instances of the vertex data for the vertex are stored than the number of graphics primitives in the group of graphics primitives that share the common vertex.

Accordingly, a (and in an embodiment each) (pre-defined) data structure in which (subset(s) of) contiguous graphics primitives are stored should be, and is in an embodiment, configured to store fewer instances of vertex data than the maximum number of instances of vertex data that would be required to store the maximum number of contiguous graphics primitives that the data structure is intended to store.

The data structure(s) are accordingly in an embodiment configured to have fewer entries for storing vertex data than the number of entries that would be required to store the maximum number of instances of vertex data for the maximum number of graphics primitives that the data structure is intended to store (i.e. fewer than enough entries to store an instance of vertex data for each individual vertex of each graphics primitive in the maximum number of graphics primitives that the data structure is intended to store).

Correspondingly, at least one entry of the data structure that stores vertex data is in an embodiment used for more than one graphics primitive (that share the vertex in question), as will be discussed below.

In particularly embodiments, a (and more in an embodiment each) of the data structures is configured to accommodate vertex data for (has entries for vertex data for) a particular, in an embodiment selected, in an embodiment predetermined, maximum number of instances of vertex data, where the maximum number of instances of vertex data that the data structure is configured to accommodate (comprises entries for vertex data for) is less than the total number of vertices of the maximum number of graphics primitives that the data structure is configured to store.

Thus, where a data structure is configured to store (up to) N contiguous graphics primitives, each graphics primitive having M vertices, the data structure should, and in an embodiment does comprise fewer than N×M entries for storing instances of vertex data. As such, at least one entry of the data structure will, where appropriate, and possible, be used to store an instance of vertex data that is used more than once (i.e. for a vertex that is shared between contiguous graphics primitives).

Thus, for example, where a data structure is configured to store three triangular graphics primitives, it will (only) comprise entries for storing vertex data of fewer than nine vertices, such as being sized to store vertex data for eight, seven, six or five vertices.

Most in an embodiment, a (and each) data structure is configured to store (and therefore comprises entries for) the minimum number of instances of vertex data of (the minimum number of) unique vertices that is required to define a group of contiguous graphics primitives comprising the maximum number of graphics primitives that the data structure is configured to store. In such a case, for each vertex in a group of contiguous graphics primitives, e.g. stored in the data structure, that is shared by more than one graphics primitive in that group of contiguous graphics primitives, only a single instance of the vertex data will be stored (there will be only a single entry for the vertex data in question).

Thus, for example, where the data structures are configured and intended to store strips of up to three contiguous triangular primitives, the data structures in an embodiment have entries for five (unique) vertices (rather than for nine vertices).

In an embodiment, along with storing vertex data as described above, a (each) data structure also includes space (e.g. entries) to store further information for the graphics primitives that it is storing (vertex) data for. For example, and in an embodiment, the data structure may have space allocated for the storage of metadata for its graphics primitives.

This further information may, and in an embodiment does, comprise one or more validity indicators. The validity indicator(s) in an embodiment indicate whether one or more entries for storing vertex data (as discussed above) are currently being used to store (valid) vertex data. In an embodiment, one validity indicator is provided for (the entries for storing vertex data for) each graphics primitive of the maximum number of graphics primitives that the data structure is configured to store. Accordingly, the validity indicators may indicate whether the data structure is being used to store the maximum number of graphics primitives, or whether it is storing another, lower number of graphics primitives (as discussed above).

The further information may further comprise an indication of the opacity of a (and in an embodiment each of the) the graphics primitives that the data structure is storing.

In embodiments, the further information comprises one more geometry indications that indicate how the graphics primitives in the data structure should be processed further (if appropriate).

Such a geometry indication may, and in an embodiment does, indicate the "material" for a graphics primitive, and so indicates what shader should be run for the graphics primitive if a ray is determined to intersect it (the shader may also depend upon the type of ray that is being tested, for example whether it is a shadow ray, a secondary ray, a primary ray etc.).

It would be possible to store a separate geometry indication for each graphics primitive stored in a data structure, and in one embodiment this is what is done.

However, in an embodiment when sorting the graphics primitives for an end point of the ray tracing acceleration data structure into groups of contiguous graphics primitives, graphics primitives are only (able to be) allocated to (included in) a (same) group of contiguous graphics primitives if (when) they have the same geometry indication as a (and each) graphics primitive currently in the group of contiguous graphics primitives. In this way, it can be ensured that graphics primitives in a group of contiguous graphics primitives (and accordingly within a and each of the subsets of the group of contiguous graphics primitives) will each have the same geometry indication.

Alternatively, in embodiments where the groups of contiguous graphics primitives are sub-divided into subsets of contiguous graphics primitives comprising up to a maximum number of contiguous graphics primitives, the determination of graphics primitives having the same geometry indication may be performed on a per-subset basis, i.e. such that the sub-division of a group of contiguous graphics primitives is done so as to ensure that each graphics primitive of a given subset of contiguous graphics primitives has the same geometry indication.

In either case, if this is done, that will have the effect that the same geometry indication will be required for each graphics primitive that a given data structure is storing. Accordingly, if this is done, the data structure(s) for the graphics primitives can be configured to store (only) a single geometry indication to be used (in common) for each graphics primitive that is stored in the data structure.

This will then allow a further reduction in the size of the data structure(s) used for storing graphics primitives (in this regard, the Applicants have realised that contiguous graphics primitives are likely to share a common geometry indication, such that this additional constraint when forming/storing the groups of contiguous graphics primitives should not unduly increase the number of partially filled data structures).

As such, in an embodiment, storing vertex data for a set of graphics primitives for an end point comprises storing vertex data for only graphics primitives having the same geometry indication in any one data structure.

Accordingly, in an embodiment, the data structures are configured to store a single geometry indication for plural, and most in an embodiment for all, of the graphics primitives stored in the data structure.

As described above, vertex data for a set of graphics primitives for an end point of a ray tracing acceleration data structure may be stored in one or more pre-defined data structures.

In one embodiment, each of the pre-defined data structures used to store graphics primitive vertex data for an end point of a ray tracing acceleration data structure is the same size and configuration, i.e. is configured to store data for the same maximum number of graphics primitives and store the same amount of vertex data for that maximum number of graphics primitives (e.g. has the same number of entries for storing vertex data).

In such a case, the graphics primitives will be stored in one or more of the pre-defined data structures, even if any group or subset of contiguous graphics primitives comprises fewer than the maximum number of graphics primitives that the data structure is configured to store data for.

However, in other embodiments, multiple data structures configured to store data for different maximum numbers of graphics primitives may be, and are in an embodiment, used. In an embodiment, such data structures configured to store different numbers of maximum numbers of graphics primitives may be used where, as described above, a group of contiguous graphics primitives does not comprise an exact multiple of a (first) particular maximum number of graphics primitives. In such a case, as described above, the group of contiguous graphics primitives may be sub-divided into subsets comprising the (first) particular maximum number of contiguous graphics primitives, and any remaining contiguous graphics primitives may be stored in a data structure configured to store a lower number of contiguous graphics primitives.

In both of the above embodiments, each pre-defined data structure may be configured to store vertex data in the more efficient method of the technology described herein, where fewer instances of the vertex data for at least one (shared) vertex are stored than the number of graphics primitives that share the vertex. As set out above, the pre-defined data structures may comprise fewer entries for storing instances of vertex data than the maximum number of instances of vertex data that may be required for the maximum number of graphics primitives that the data structure is configured to store.

However, in other embodiments, an alternative pre-defined data structure may be provided for storing vertex data for graphics primitives. The alternative pre-defined data structure may be configured to store vertex data in a different configuration (for example may have a different number of entries for storing vertex data) to the (more efficient) pre-defined data structures described above. For example, and in an embodiment, the alternative pre-defined data structure may be configured to store (e.g. to have an entry for) an instance of the vertex data for each vertex of each graphics primitive that the alternative data structure is configured to store, even if this vertex data is shared between multiple graphics primitives.

For example, if the alternative data structure can store up to three graphics primitives in the form of triangles, the alternative data structure may be configured to store instances of the vertex data for each of the three vertices for each triangle, and so store nine instances (entries) of vertex data (rather than as few as the five unique instances of vertex data, as may be stored in embodiments using the more efficient data structures described above).

Use of such an alternative data structure may be more efficient when a set of graphics primitives for an end point of the ray tracing acceleration data structure comprises a large number of graphics primitives that are not contiguous with any other graphics primitives in the set of graphics primitives.

For non-contiguous graphics primitives, it is typically not possible to store fewer instances of the vertex data than the maximum number of instances of vertex data for the non-contiguous graphics primitives, as the (efficient) data structures configured to store fewer instances of vertex data for a particular maximum number of graphics primitives (as described above) are not able to (e.g. do not have sufficient entries to) store the maximum number of graphics primitives for non-contiguous graphics primitives.

As such, when data structures configured to store fewer instances of vertex data for a particular maximum number of graphics primitives are used to store non-contiguous graphics primitives, not all of the data structure (e.g. not all of the entries of the data structure) can be used, and so the data structure will be left partially empty.

Providing an alternative data structure configured to store (i.e. having sufficient entries for) each instance of the vertex data of each graphics primitive that the alternative data structure is able to store may therefore allow non-contiguous graphics primitives to be stored without part of (e.g. entries of) the data structures needing to be left unfilled.

It will be appreciated that such an alternative data structure configured to store (i.e. having sufficient entries for) each instance of the vertex data of each graphics primitive that the alternative data structure is configured to store may be similarly beneficial where a majority of groups of contiguous graphics primitives only include a small number of graphics primitives, such as a number of graphics primitives similar to or smaller than the maximum number of graphics primitives that the (more efficient) data structures are sized to receive.

A determination of whether to store graphics primitives using the alternative data structure can be made in any suitable way.

For example, and in an embodiment, the determination can be made for a (and in an embodiment each) end point of a ray tracing acceleration data structure as a whole, such that either "more efficient" or only "alternative" data structure(s) are used for all of the graphics primitives that an end point represents. In an embodiment this occurs before any sorting of the graphics primitives for the end point occurs, and when it is determined to use the alternative data structure the graphics primitives for the end point are not (attempted to be) sorted into groups of contiguous graphics primitives. Such a determination may be made, for example, based on a number of graphics primitives to be stored for the end point, or based on other information about the position, type, or another suitable criteria, of geometry of the end point.

Alternatively, the determination may be made during the process of storing a set of graphics primitives for an end point, after graphics primitives of the set of graphics primitives have been (attempted to be) sorted into groups of contiguous graphics primitives.

For example, after a set of graphics primitives has been (attempted to be) sorted into groups of contiguous graphics primitives, any graphics primitives that could not be sorted into groups of contiguous graphics primitives may be stored using the alternative data structure. Furthermore, it may be determined that any group of contiguous graphics primitives having fewer than a a particular, in an embodiment selected, in an embodiment predetermined, threshold number of contiguous graphics primitives can be (sub-divided if desired, as described above, and) stored using the data structures described above, whilst groups of contiguous graphics primitives comprising graphics primitives fewer than the threshold number may be stored using the alternative data structure.

In another embodiment, the choice between the pre-defined, more efficient data structure and alternative data structure may be made at the stage of storing the vertex data for the graphics primitives. For example, vertex data may be attempted to be stored in the data structures described above configured to store fewer than a maximum number of instances of vertex data for a particular maximum number of contiguous graphics primitives, and if this is not possible (for example because there are not the maximum number of contiguous graphics primitives to be stored), the alternative data structure may be used.

Other arrangements would, of course, be possible.

Accordingly, according to an embodiment of the technology described herein, storing vertex data for a set of graphics primitives for an end point further comprises, for at least one graphics primitive of the set of graphics primitives, storing the at least one graphics primitive in an alternative data structure, configured to store one instance of vertex data per vertex of the graphics primitives stored in the alternative data structure.

In embodiments, the alternative data structure may be configured to store an instance of vertex data for each vertex of one or more graphics primitives. In particular, (even) where a vertex is shared between more than graphics primitive to be stored in the alternative data structure, an instance of the vertex data is stored for each graphics primitive.

For example, and in an embodiment, the alternative data structure may be configured to store an instance of vertex data for each individual vertex for two, three, four, or any other suitable and desired number of graphics primitives. For example, in the example where the alternative data structure stores three graphics primitives in the form of triangles, the alternative data structure is sized to store nine instances of vertex data, one for each individual vertex of the three triangles.

The alternative data structure in an embodiment also comprises space to store further information, such as metadata, transparency indicators, and validity indicators for the graphics primitives, as described above.

The alternative data structure may further store one or more geometry indications as described above. It would be possible to store a single geometry indication that can be used for each of the graphics primitives stored in the alternative data structure, as described above for the pre-defined data structures, and in an embodiment this is what is done.

However, in an embodiment the alternative data structure is configured to store one geometry indication for each graphics primitive that the alternative data structure is configured to store.

In the technology described herein, for a vertex of a group of contiguous graphics primitives that is shared by at least two graphics primitives of the group of contiguous graphics primitives, fewer instances of the vertex data for the shared vertex are stored than the number of graphics primitives in the group of contiguous graphics primitives that share the vertex to more efficiently store the vertex data. In some embodiments, further measures may also be taken to reduce the amount of information that must be stored for the graphics primitives.

In one embodiment, pairs of graphics primitives sharing a common edge are identified in a group of contiguous graphics primitives. A first primitive of the pair of graphics primitives is stored in a data structure. Only a single instance of at least one of (and in an embodiment both of) the vertices of the common edge is stored rather than storing an instance of the vertex data for each of the first and second graphics primitive of the pair of graphics primitives in the manner described above. The remaining vertex (or vertices) of the second graphics primitive may be estimated by reflecting the first graphics primitive about the shared edge. The difference in vertex position(s) between such a reflection and the corresponding actual vertex (or vertices) of the second graphics primitive can be stored (instead of storing the corresponding actual vertex position).

For example, in the case that the graphics primitives are triangles, the difference between the final vertex of the second graphics primitive in the pair of graphics primitives and the position of a parallelogram defined by the vertices of the first graphics primitive is determined and stored in place of the position of the final vertex of the second vertex.

Typically, the position of such a reflected vertex will be relatively close to the actual position of the vertex. As such, it is possible to use fewer bits of data to store such a correction than is necessary to store the (full) position of the vertex.

In an embodiment, the sorting into groups and storage of graphics primitives in data structures is performed separately for each of plural of, and in an embodiment all of, the end points of the ray-tracing acceleration data structure that represent sets of graphics primitives defined for the scene.

Once the graphics primitives for an (and in an embodiment for each) end point of the ray tracing acceleration data structure have been stored according to the technology described herein and its embodiments, the ray tracing acceleration data structure may be used when performing a ray tracing process (in any suitable and desired way).

The ray tracing process can be any suitable and desired ray tracing process using a ray tracing acceleration data structure indicative of the geometry for the scene to be rendered to determine geometry for the scene that may be intersected by a ray being used for the ray racing operation.

In an embodiment the ray tracing process comprises a ray tracing acceleration data structure traversal operation.

The ray tracing acceleration data structure traversal operation in an embodiment involves traversing the ray tracing acceleration data structure, testing rays for intersection with volumes of the scene represented by parts of the ray tracing acceleration data structure, and maintaining a record of which volumes of the scene represented by the ray tracing acceleration data are intersected by which rays, e.g. to determine which parts of the ray tracing acceleration data structure should therefore be tested next for the ray, and so on, down to the end points, e.g., at the lowest level, of the ray tracing acceleration data structure.

The traversal can be performed in any suitable fashion, as desired.

For example, and in an embodiment, as described above, the ray tracing acceleration data structure comprises a tree structure that is configured such that each leaf node of the tree structure represents a set of primitives defined within the respective volume that the leaf node corresponds to, and with the non-leaf nodes representing hierarchically-arranged larger volumes up to a root node at the top level of the tree structure that represents an overall volume for the scene in question that the tree structure corresponds to. Each non-leaf node is therefore in an embodiment a parent node for a respective set of plural child nodes with the parent node volume encompassing the volumes of its respective child nodes. In an embodiment, each (non-leaf) node is therefore associated with a respective plurality of child node volumes, each representing a (in an embodiment non-overlapping) sub-volume within the overall volume represented by the node in question.

In that case, the ray tracing acceleration data structure can thus be (and in an embodiment is) traversed by proceeding down the branches of the tree structure and testing the rays against the child volumes associated with a node at a first level of the tree structure to thereby determine which child nodes in the next level of the tree structure should be tested, and so on, down to the level of the respective leaf nodes at the end of the branches of the tree structure.

That is, in embodiments, where the ray tracing acceleration data structure comprises a tree structure of this type, the testing of the one or more rays against the volume associated with a node comprises testing the rays against each of the child node volumes associated with the node, and outputting a result of the testing for each of the child nodes of the node in question.

Once it has been determined by performing such a traversal operation for a ray which end points of the ray tracing acceleration data structure represent geometry that may be intersected by the ray, the actual geometry intersections for the ray for the geometry that occupies the volumes associated with the intersected end point can be determined accordingly, e.g. by testing the ray for intersection with the individual units of geometry (e.g. primitives) defined for the scene that occupy the volumes associated with the end points of the ray tracing acceleration data structure.

In accordance with the technology described herein, at least some end points of the ray tracing acceleration data structure (e.g. leaf nodes) represent subsets of graphics primitives that occupy a volume within a scene that the end (e.g. leaf node) corresponds to, and accordingly the indication of the geometry for the volume in question includes vertex data for said graphics primitives.

In order to perform the ray-primitive intersection testing and any required subsequent processing, the ray tracing process uses this vertex data for graphics primitives defined for the scene.

In accordance with the technology described herein, for a vertex of a group of contiguous graphics primitives that is shared by at least two graphics primitives of the group of contiguous graphics primitives, fewer instances of the vertex data for the shared vertex are stored than the number of graphics primitives that share the vertex.

However, when using the vertex data, such as when performing ray-primitive intersection testing, it may be necessary to use an instance of vertex data for each vertex of each graphics primitive. For example, when the vertex data comprises a vertex position, a vertex position may need to be used for each individual vertex of each of the graphics primitives to be tested (such that, for example, the data for each graphics primitive is complete and such that ray-primitive intersection testing may be performed for each graphics primitive individually).

Accordingly, when fewer instances of vertex data than the number of graphics primitives that share the vertex data have been stored for a vertex that is shared by at least two contiguous graphics primitives, then using the vertex data when testing rays for intersection with the ray tracing acceleration data structure to determine geometry for the scene to be rendered that may be intersected by the rays comprises using the same instance of the vertex data that is stored for the end point for the shared vertex for more than one of the contiguous graphics primitives that share the vertex.

The technology described herein extends to using geometry data in this way.

As such, a third embodiment of the technology described herein comprises a method of using geometry data by a graphics processor when rendering a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

the method comprising, when using a ray tracing acceleration data structure when rendering a frame that represents a view of a scene using a ray tracing process:

fetching vertex data for a set of graphics primitives for an end point of the ray tracing acceleration data structure; and using the vertex data when testing rays for intersection with the ray tracing acceleration data structure to determine geometry for the scene to be rendered that may be intersected by the rays;

wherein, when fewer instances of the vertex data have been stored for a vertex that is shared by at least two contiguous graphics primitives than the number of graphics primitives that share the vertex, using the vertex data when testing rays for intersection with the ray tracing acceleration data structure to determine geometry for the scene to be rendered that may be intersected by the rays comprises using the same instance of the vertex data that is stored for the end point for the shared vertex for more than one of the contiguous graphics primitives that share the vertex.

A fourth embodiment of the technology described herein comprises a graphics processor that is operable to render a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

wherein the graphics processor is configured to, when using a ray tracing acceleration data structure when rendering a frame that represents a view of a scene using a ray tracing process:

fetch vertex data for a set of graphics primitives for an end point of the ray tracing acceleration data structure; and use the vertex data when testing rays for intersection with the ray tracing acceleration data structure to determine geometry for the scene to be rendered that may be intersected by the rays;

wherein, when fewer instances of the vertex data have been stored for a vertex that is shared by at least two contiguous graphics primitives than the number of graphics primitives that share the vertex, using the vertex data when testing rays for intersection with the ray tracing acceleration data structure to determine geometry for the scene to be rendered that may be intersected by the rays comprises using the same instance of the vertex data that is stored for the end point for the shared vertex for more than one of the contiguous graphics primitives that share the vertex.

As will be appreciated by those skilled in the art, these additional embodiments of the technology described herein relating to the using of vertex data can, and in an embodiment does, include any one or more or all of the features of the other embodiments technology described herein described herein, as appropriate.

The vertex data for an end point may be fetched in any suitable and desired way.

For example, as discussed above, in particularly embodiments, vertex data for an end point is stored in one or more pre-defined data structures, comprising one or more entries for storing data.

As set out above, in embodiments, end points of the ray tracing acceleration data structure may have associated with them a list of indications, in an embodiment a list of pointers, that indicate the locations of pre-defined data structures in which graphics primitives for the end point are stored.

In such embodiments, fetching vertex data for an end point comprises reading the locations in memory indicated by respective ones of the indications from the list of indications, and fetching the data stored in the data structures at those locations to access the geometry data stored therein.

In particularly embodiments, the pre-defined data structure(s) in which vertex data for graphics primitives is stored comprise a plurality of entries for storing data, where each entry is used to (only) store a particular piece of data (for example, a vertex position for a particular vertex of a particular graphics primitive).

When, in accordance with the technology described herein, such a data structure stores fewer instances of the vertex data for a vertex that is shared by at least two contiguous graphics primitives, the same instance of vertex data that is stored for an end point is used for more than one of the graphics primitives that shares the vertex.

Accordingly, in embodiments, using vertex data stored in such a data structure may comprise using vertex data from a particular entry of the data structure multiple times (where that entry corresponds to vertex data for a vertex that is shared by at least two contiguous graphics primitives).

In this case, in an embodiment, vertex data may be fetched twice from the same entry in the data structure (e.g. to be used for more than contiguous graphics primitive that shares the vertex). Alternatively, vertex data may be fetched from the entry only once, but subsequently used in respect of the vertices of multiple graphics primitives (that share the common) vertex.

Use of a same instance of vertex data for a shared vertex for more than one of the contiguous graphics primitives that share the vertex in this manner (i.e. processing of data stored in the manner of the technology described herein as described above) can be triggered in any suitable and desired manner. In an embodiment, this is related to the type of data structure in which the graphics primitives are stored.

For example, and in an embodiment, the pre-defined data structure may include an indication, for example a flag, that indicates that it is a data structure that stores fewer instances of vertex data for a shared vertex than the number of graphics primitives in a group of contiguous graphics primitives that share the vertex. If such a flag is present (and the data structure is being used to store vertex data for more than one graphics primitive), then the vertex data stored in at least one entry of the data structure represents a vertex for more than one graphics primitive, and therefore should be (and is) used with and for said more than one graphics primitive when performing a ray tracing operation using the ray tracing acceleration data structure.

Alternatively, the use of the data structure that stores data in the manner of the technology described herein may be identified in other ways, such as from an intrinsic property of the data structure (for example the size of the data structure), which may allow the data structure to be differentiated from other types of data structure that may have been used to store vertex data.

Other arrangements would of course be possible.

As described above, data structures may include one or more validity indicators to indicate whether a data structure is being used to store a maximum number of graphics primitives, or whether it is storing another, lower number of graphics primitives. Such validity indicators may therefore indicate which entries of a data structure are being used to store (valid) vertex data. In such a case, reading vertex data from the data structure may comprise using one or more validity indicators to identify whether one or more entries of a data structure are being used to store vertex data, and only reading vertex data from those entries indicated to be (validly) storing vertex data.

In whatever manner the ray-primitive intersection testing is performed, the end result is to determine which geometry (if any) is intersected by which rays.

For any geometry (primitives) that is it determined is actually intersected by a ray, various processing steps can then be taken to determine the effect (e.g. appearance) this should have on the sampling position for which the ray was cast.

Thus, once the geometry that a ray(s) will actually intersect (if any) has been determined, then a programmable execution unit in an embodiment performs further processing for the sampling positions in the frame that the rays correspond to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Correspondingly, rendering process in an embodiment may comprise shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

Once the ray tracing-based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

The ray tracing process can be used for all forms of output that a graphics processor may output. Thus, it may be used when generating frames for display, for render-to-texture outputs, etc. The output from the graphics processor is, in an embodiment, exported to external, e.g. main, memory, for storage and use.

The graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

It will be appreciated by those skilled in the art that all of the described embodiments of the technology described herein can, and in an embodiment do, include, as appropriate, any one or more or all of the features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
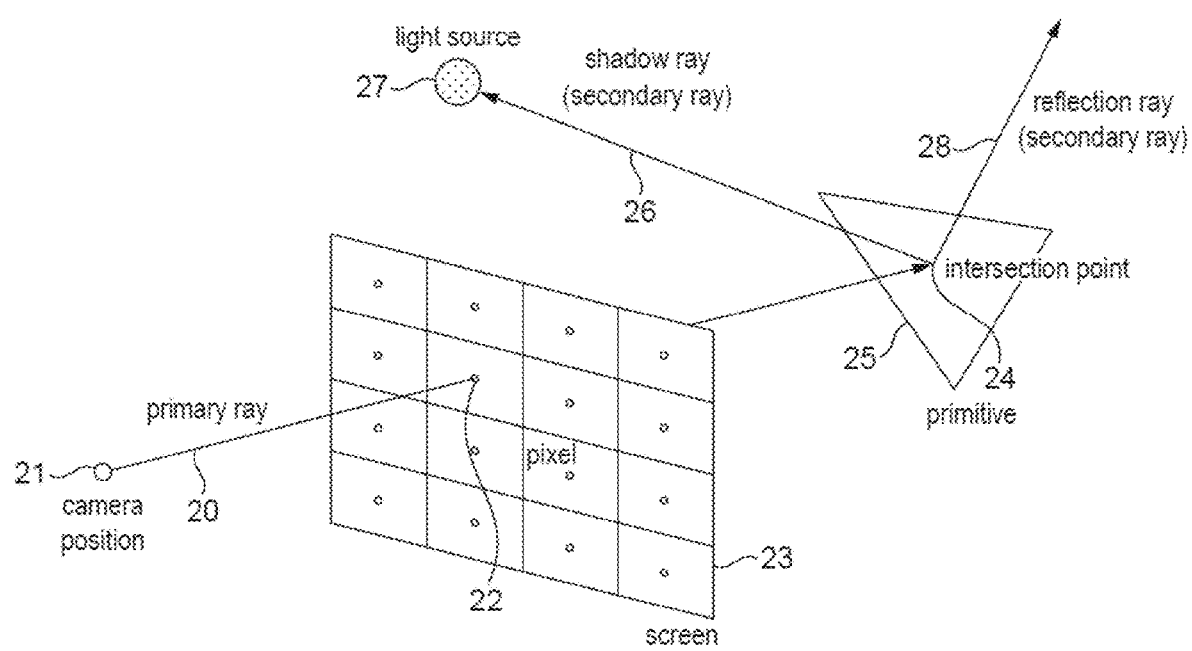
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered). In the present embodiments, ray tracing acceleration data structures in the form of Bounding Volume Hierarchy (BVH) trees are used.

Figure 3:
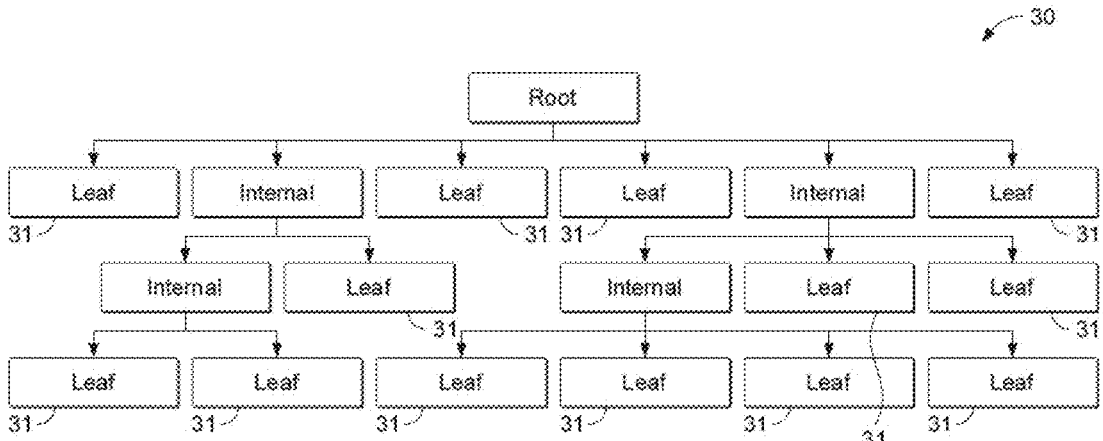
FIG. 3 shows an exemplary ray tracing acceleration data structure.

FIG. 3 shows an exemplary BVH tree 30, constructed by enclosing a volume in an axis-aligned bounding volume (AABV), e.g. a cube, and then recursively subdividing the bounding volume into successive sub-AABVs according to any suitable and desired subdivision scheme, until a desired smallest subdivision (volume) is reached.

In this example, the BVH tree 30 is a relatively "wide" tree wherein each bounding volume is subdivided into up to six sub-AABVs. However, in general, any other suitable tree structure may be used, and a given node of the tree may have any suitable and desired number of child nodes.

Thus, each node in the BVH tree 30 will have a respective volume associated with it, with the end, leaf nodes 31 each representing a particular smallest subdivided volume, and any parent node representing, and being associated with, the volume of its child nodes.

A complete scene may be represented by a single BVH tree, e.g. with the tree storing the geometry for the scene in world space. In this case, each leaf node of the BVH tree 30 may be associated with the geometry defined for the scene that falls, at least in part, within the volume that the leaf node corresponds to (e.g. whose centroid falls within the volume in question). The leaf nodes 31 may represent unique (non-overlapping) subsets of primitives defined for the scene falling within the corresponding volumes for the leaf nodes 31.

Figure 4:
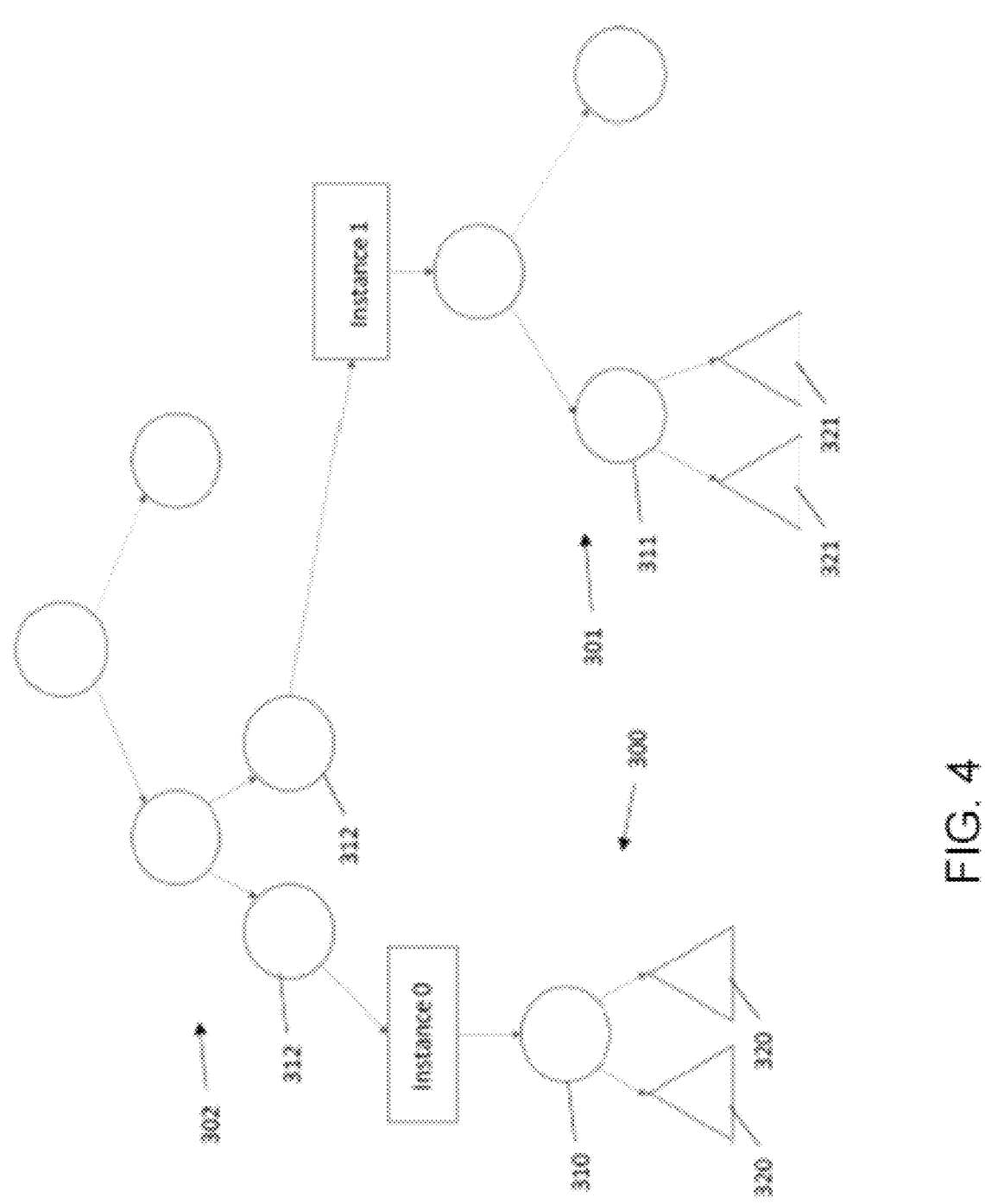
FIG. 4 shows in more detail an exemplary multi-level arrangement of ray tracing acceleration data structures that may be used according to embodiments of the technology described herein.

In the present embodiments, a two-level arrangement of ray tracing acceleration data structures is used to represent the distribution of geometry within the scene to be rendered. FIG. 4 shows an exemplary two-level arrangement of ray tracing acceleration data structures in which each instance or object within the scene is associated with a respective bottom-level acceleration structure (BLAS) 300, 301, which in the present embodiments is in the form of a respective BVH tree that stores geometry in model space, with each leaf node 310, 311 of the BVH tree representing a unique subset of primitives 320, 321 defined for the instance or object falling within the corresponding volume.

A separate top-level acceleration structure (TLAS) 302 then contains references to the set of bottom-level acceleration structures (BLAS), together with a respective set of shading and transformation information for each bottom-level acceleration structure (BLAS). In the present embodiments, the top-level acceleration structure (TLAS) 302 is defined in world space and is in the form of a BVH tree having leaf nodes 312 that each point to one or more of the bottom-level acceleration structures (BLAS) 300, 301.

The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Other forms of ray tracing acceleration data structure would be possible.

Figure 5:
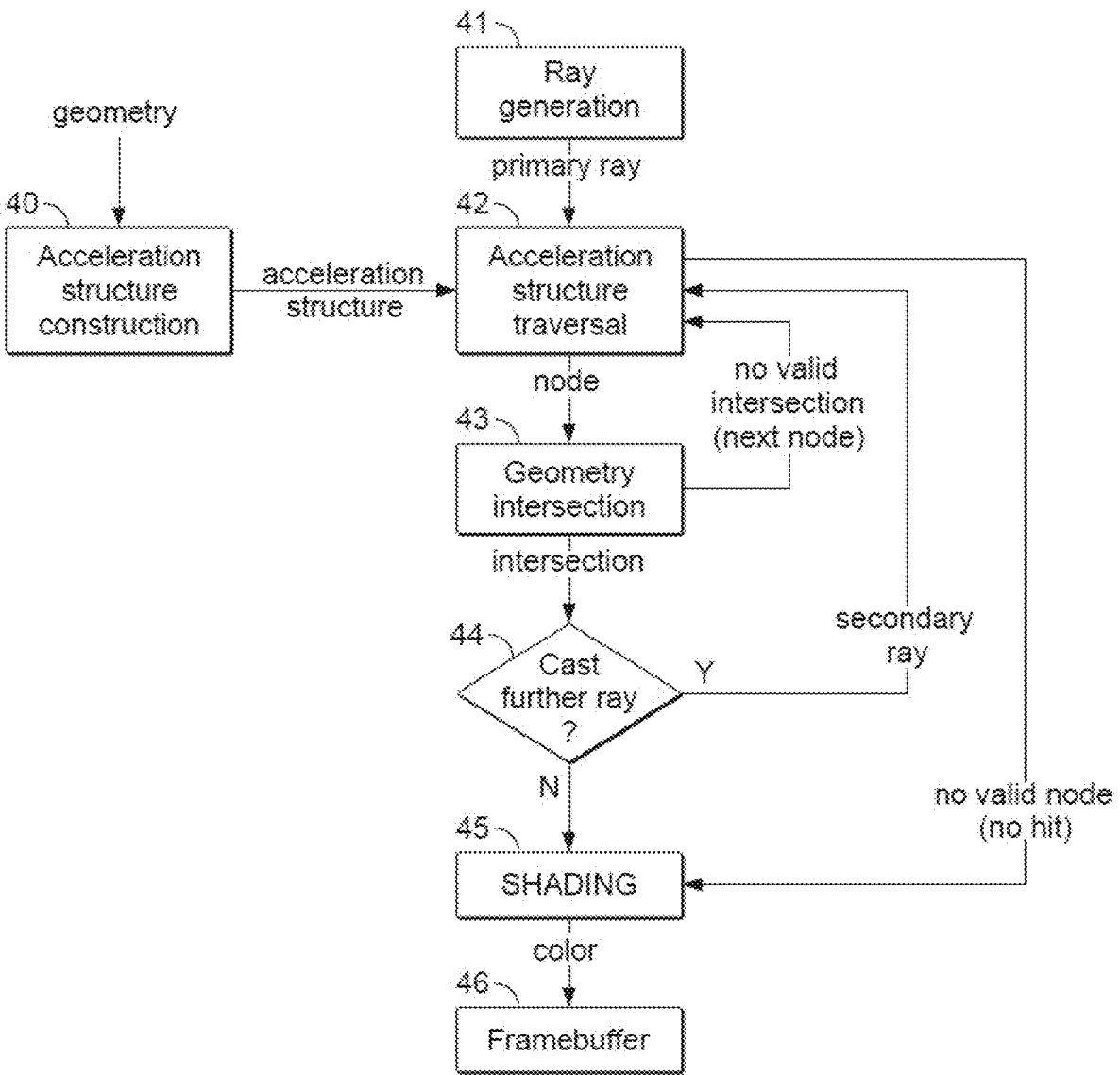
FIG. 5 is a flow chart illustrating an embodiment of a full ray tracing process.

FIG. 5 is a flow chart showing the overall ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 5, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc., The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 6:
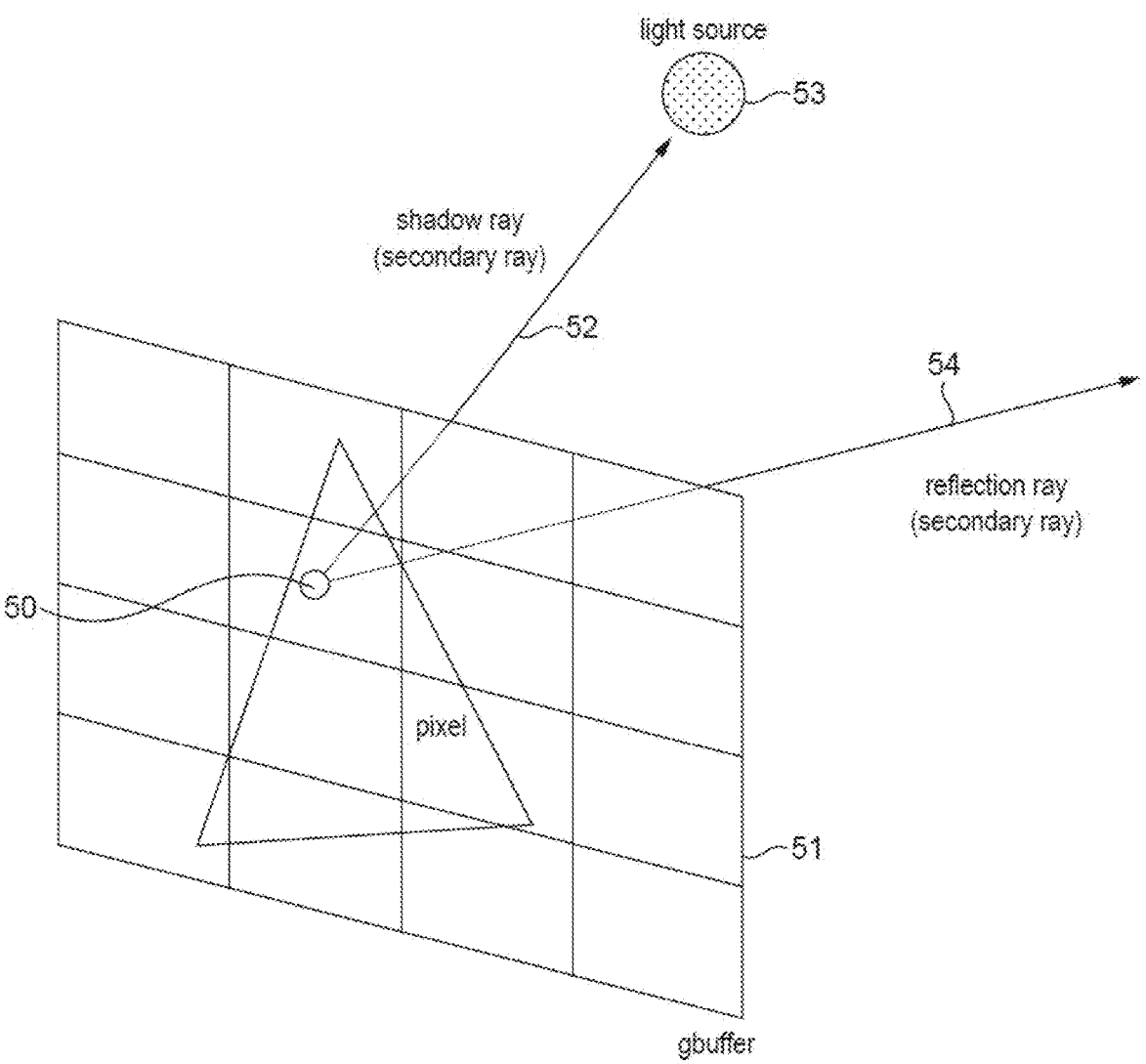
FIG. 6 is a schematic diagram illustrating a "hybrid" ray tracing process.

FIG. 6 shows an alternative ray tracing process which may be used in embodiments of the technology described herein, in which only some of the steps of the full ray tracing process described in relation to FIG. 5 are performed. Such an alternative ray tracing process may be referred to as a "hybrid" ray tracing process.

In this process, as shown in FIG. 6, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 5, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 5. Thus, steps 42, 43 and 44 will be performed in the same manner as previously described in relation to the full ray tracing process for any secondary rays.

The colour determined for a sampling position will be written to the frame buffer in the same manner as step 46 of FIG. 5, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above, and in particular to the ray tracing acceleration data structure traversal and geometry intersection (steps 42-43 in FIG. 5) performed as part of the ray tracing operation.

Figure 7:
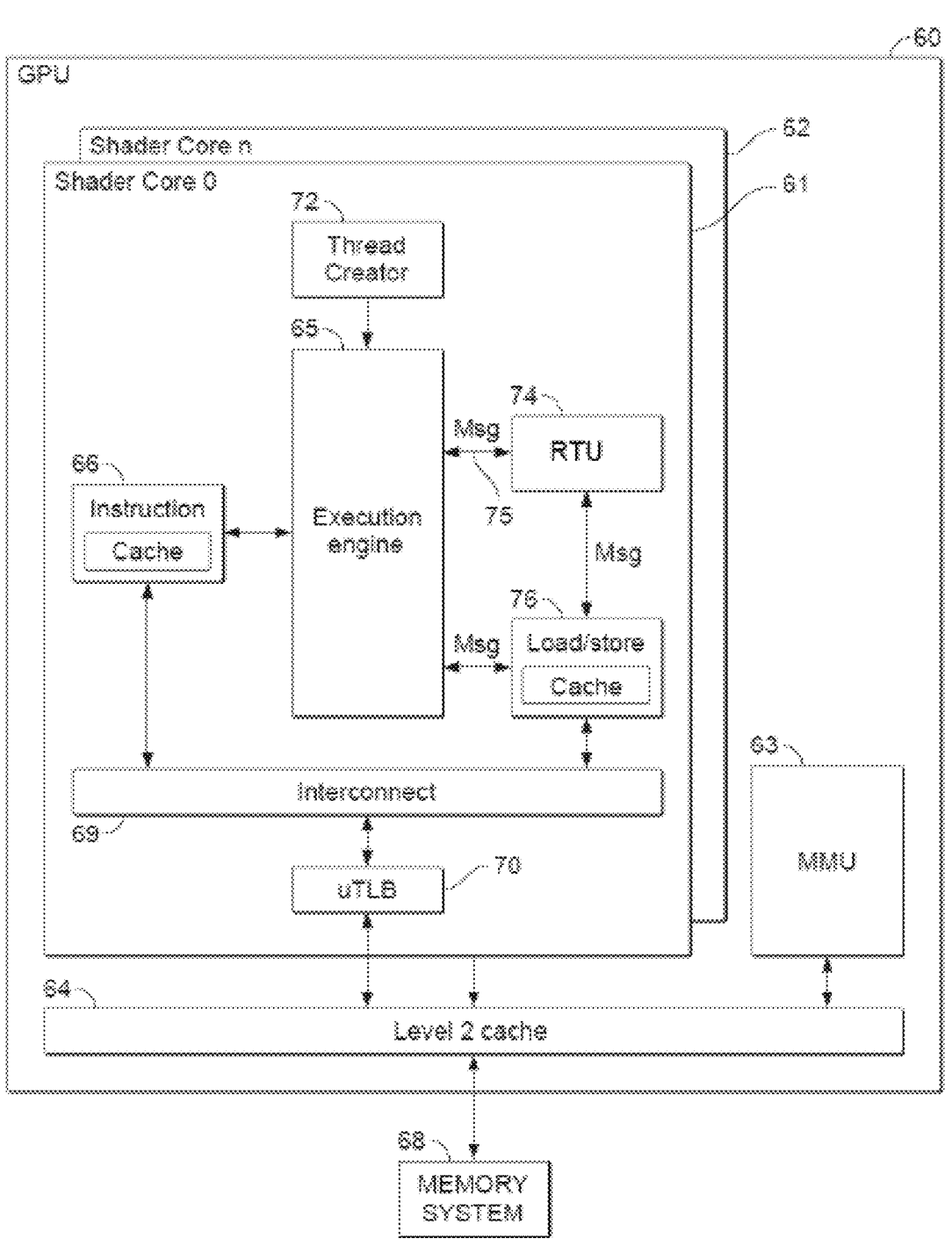
FIG. 7 shows schematically an embodiment of a graphics processor that can be operated in the manner of the technology described herein.

FIG. 7 shows schematically the relevant elements and components of a graphics processor (GPU) 60 of the present embodiments.

As shown in FIG. 7, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 7 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, a ray, etc., The shader cores will process each "item" by means of one or more execution threads which will execute the instructions of the shader program(s) in question for the "item" in question. Typically, there will be multiple execution threads each executing at the same time (in parallel).)

FIG. 7 shows the main elements of the graphics processor 60 that are relevant to the operation of the present embodiments. As will be appreciated by those skilled in the art there may be other elements of the graphics processor 60 that are not illustrated in FIG. 7. It should also be noted here that FIG. 7 is only schematic, and that, for example, in practice the shown functional units may share significant hardware circuits, even though they are shown schematically as separate units in FIG. 7. It will also be appreciated that each of the elements and units, etc., of the graphics processor as shown in FIG. 7 may, unless otherwise indicated, be implemented as desired and will accordingly comprise, e.g., appropriate circuits (processing logic), etc., for performing the necessary operation and functions.

As shown in FIG. 7, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 7, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 7, the shader core 61 further comprises a thread creator (generator) 72 operable to generate execution threads for execution by the programmable execution unit 65.

As shown in FIG. 7, the shader core 61 also includes a ray tracing circuit (unit) ("RTU") 74, which is in communication with the programmable execution unit 65, and which is operable to perform the required geometry intersection determinations for rays being processed as part of a ray tracing-based rendering process (i.e. the operations of steps 42 and 43 of FIG. 5 of traversing the acceleration data structure to determine with reference to the node volumes of the acceleration data structure geometry that is potentially intersected by the ray and the corresponding ray-primitive testing to determine which geometry, if any, is actually intersected by the ray), in response to messages 75 received from the programmable execution unit 65.

The RTU 74 is also able to communicate with the load/store unit 76 for loading in the required data for such intersection testing, such as the node data defining the nodes to be tested (e.g. which node data may include data identifying a set of primitives, but could also identify a BLAS to be traversed, as well as any transform that is to be applied, for example).

In the present embodiments, the RTU 74 of the graphics processor is a (substantially) fixed-function hardware unit (circuit) that is configured to perform the required operations to determine geometry for a scene to be rendered that may be (and is) intersected by a ray being used for a ray tracing operation. However, some amount of configurability may be provided.

Figure 8:
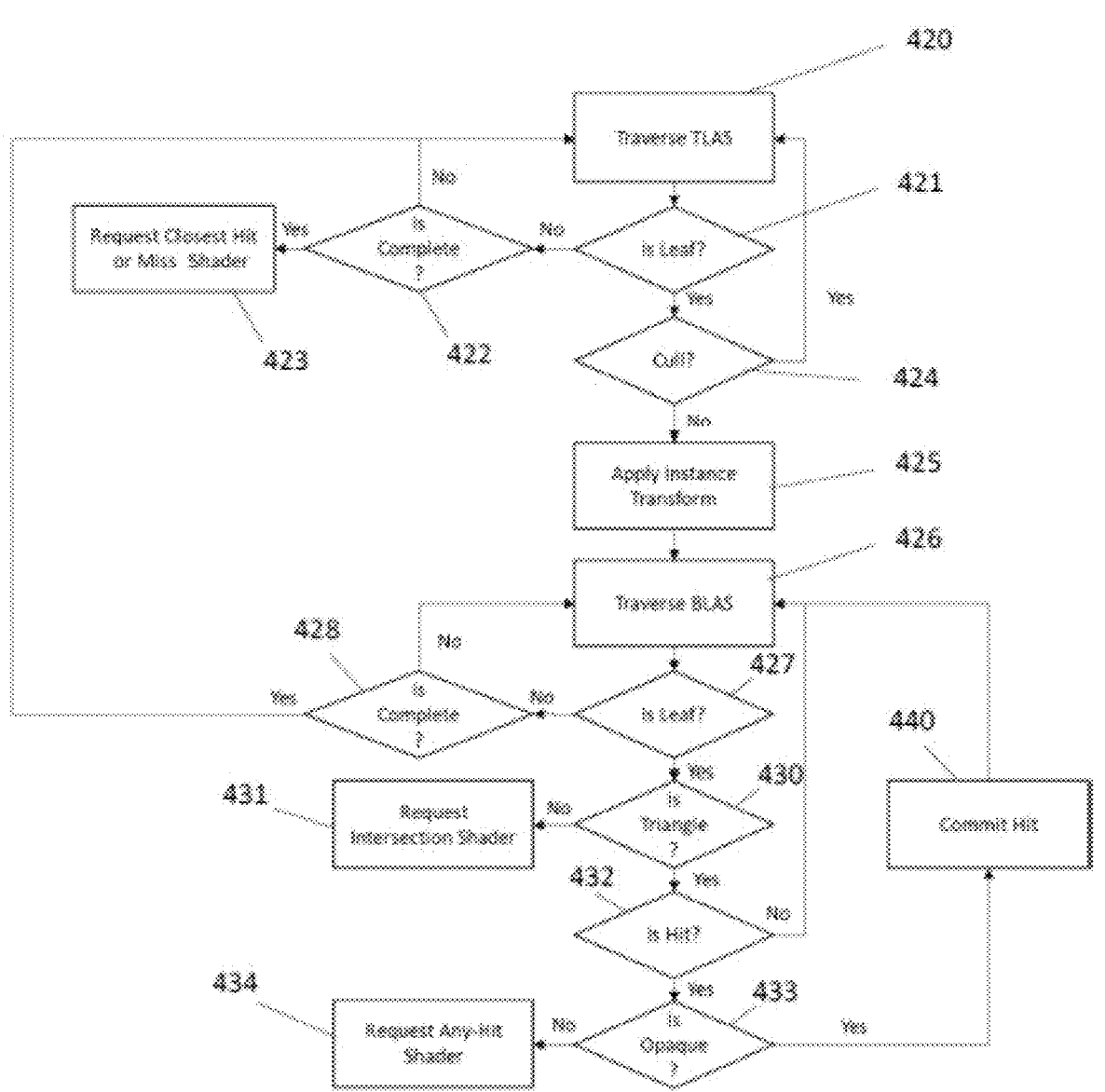
FIG. 8 is a flow chart illustrating the ray tracing operations that can be performed by a ray tracing unit ("RTU") of a graphics processor according to an embodiment of the technology described herein in response to the graphics processor programmable execution unit messaging the RTU to determine the geometry, if any, that is intersected by a particular ray.

FIG. 8 is a flow chart showing the operation of the RTU 74 according to the present embodiments in response to receiving a message from the programmable execution unit 65 to determine, for a group of rays for which a program to perform ray tracing is being executed by a respective thread group (warp) within the programmable execution unit, the geometry, if any, that is intersected by the rays in question.

FIG. 8 in particular shows in more detail the traversal operations that are performed by the RTU for a two-level arrangement of acceleration structures, e.g. as described above with reference to FIG. 4. As shown in FIG. 8, in this case, acceleration structure traversal begins with TLAS traversal (step 420), and TLAS traversal continues in search of a TLAS leaf node (steps 421, 422).

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate ("object") space for BLAS traversal (step 425). BLAS traversal then begins (step 426), and continues in search of a BLAS leaf node (steps 427, 428). If no BLAS leaf node can be identified, the process may return to TLAS traversal (step 420) until all of the nodes have been tested, as necessary, and the traversal operation is completed.

In the present embodiments, geometry associated with a BLAS leaf node can be in the form of a set of triangle primitives or an axis aligned bounding box (AABB) primitive. When (at step 427) a BLAS leaf node is identified, it is determined whether geometry associated with the leaf node is in the form of a set of triangle primitives or an axis aligned bounding box (AABB) primitive (step 430). As shown in FIG. 8, when an axis aligned bounding box (AABB) primitive is encountered, execution of a shader program ("intersection" shader) that defines a procedural object encompassed by the axis aligned bounding box (AABB) is triggered (step 431) to determine whether a ray intersects the procedural object defined by the shader program.

On the other hand, when a set of triangle primitives is encountered, determining whether a ray intersects any of the triangle primitives is performed by the RTU (step 432), as shown in FIG. 8. Thus, if no (valid) triangle primitives which the ray intersects can be identified in the node, the process returns to BLAS traversal (step 426). If a ray is found to intersect a triangle primitive, it is determined whether or not the triangle primitive is opaque (step 433). In the case of the triangle primitive being found to be non-opaque, execution of an appropriate shader program ("any-hit" shader) may be triggered (step 434). Otherwise, in the case of the triangle primitive being found to be opaque, the intersection can be committed without executing a shader program (step 440), and the BLAS traversal continued accordingly (step 426).

The traversal thus proceeds in this way, determining which nodes, if any, are intersected by the ray for which the traversal is being performed.

If no TLAS leaf node can be identified that is intersected by the ray, it is determined that there is an intersection miss, and in that case, a "default" shading operation ("miss" shader) may be performed (step 423), e.g. as described above. If the ray does intersect some geometry, so long as the geometry is an opaque triangle (i.e. step 433—yes), the geometry can be automatically committed, e.g., and in embodiments, added to a record of the intersected geometry. Once the traversal is completed (step 422), the appropriate "closest-hit" shader can then be invoked accordingly (step 423) for further processing of the ray. For instance, depending on the geometry that is intersected, rendering (shading) of the sampling position and/or traversal for one or more secondary rays may be triggered, as appropriate, e.g. as discussed above.

On the other hand, as shown in FIG. 8, if the ray is determined to intersect more complex (non-triangle) primitives such as an axis aligned bounding box (AABB) primitive (at step 430), the RTU in the present embodiments is not able to automatically commit that hit, and the traversal is instead stopped at this point such that the ray can be returned to the programmable execution unit to execute the required "intersection" shader (as determined by the RTU at step 431).

Likewise, if the ray is determined to intersect a non-opaque triangle (step 433—no), the RTU in the present embodiments again cannot automatically commit that hit, as it is required to first execute an appropriate "any-hit" shader (as determined by the RTU at step 434) in order to determine whether or not the hit should be committed. Thus, again, in this situation, the traversal is stopped at this point such that the ray can be returned to the programmable execution unit to execute the required "any-hit" shader.

In both these cases, the traversal is therefore stopped in order to return the processing of the ray to the programmable execution unit to execute the required shader program routine. Once the required shader has been executed, however, the ray should then be (and is) returned to the RTU in order to complete its traversal.

Figures 9A, 9B:
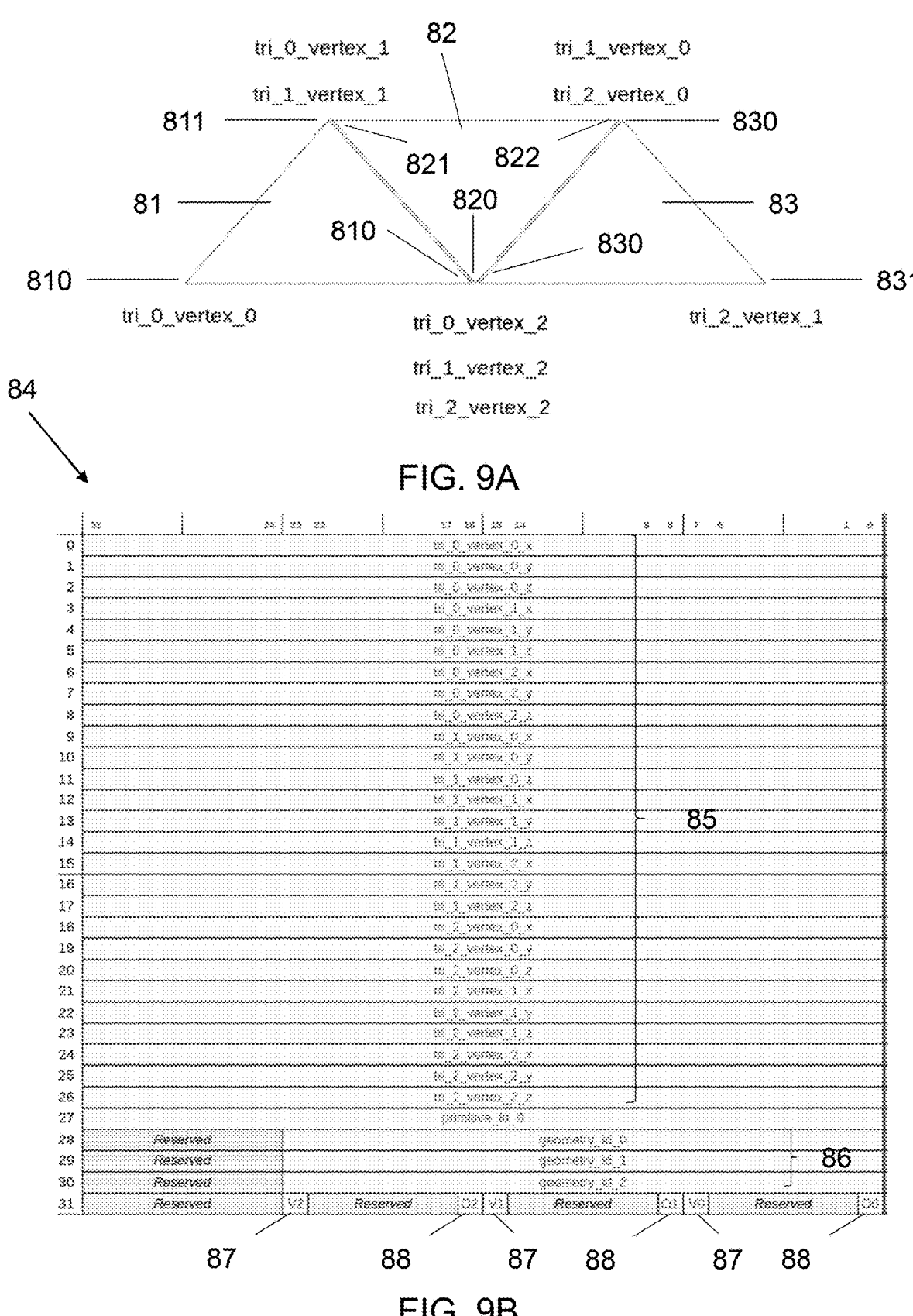
FIG. 9A and FIG. 9B show one way of storing vertex data for graphics primitives.

FIGS. 9A and 9B show one way of storing vertex data for three graphics primitives for use when performing ray tracing. FIG. 9A shows the vertices for each of a first graphics primitive 81, a second primitive 82, and a third graphics primitive 83. Each of the graphics primitives are triangles including three vertices (810, 811, 812, 820, 821, 822, 830, 831, 832).

Each vertex has with it associated vertex data (e.g. tri_0_vertex_0), which is stored in a data structure 84 as shown in FIG. 9B. In this case, the data structure comprises 32 lines for storing data, each comprising 32 bits.

In this case the vertex data for each vertex comprises the vertex position for each vertex. The vertex positions in each of the x, y and z directions are stored in single precision floating point format, occupying 32 bits (and so one line of the data structure per vertex). This is stored for each vertex of each of the graphics primitives, and therefore 27 lines are required to store the vertex positions for the three graphics primitives.

It will be appreciated that for the graphics primitives of FIG. 9A, the three graphics primitives are contiguous. It will be seen that a first vertex 810 of the first graphics primitive 81 is not shared with the second graphics primitive 82 or third graphics primitive 83. However, the second vertex 811 of the first graphics primitive 81 is in the same location as the second vertex 821 of the second graphics primitive 82. Accordingly, the same position is stored with respect to the second vertex 811 of the first graphics primitive 81 and second vertex 821 of the second graphics primitive 82 (i.e., for example, tri_0_vertex_1_x is the same as tri_1_vertex_1_x), and so the same values of the x, y, and z positions are stored in two different lines of the data structure 84.

Similarly, the third vertex 812 is in the same location as the third vertex 822 of the second graphics primitive 82 and the third vertex 832 of the third graphics primitive 83, and therefore the same value corresponding to the x, y and z positions of these vertices are repeated in three different locations in the data structure 84 (for example tri_0_vertex_2_x is the same as tri_1_vertex_2_x and tri_2_vertex_2_x).

The data structure 84 also comprises respective geometric indications 86 for each of the three graphics primitives (81, 82, 83). The geometric indication indicates the "material" for a graphics primitive, and so indicates what shader should be run for the graphics primitive if a ray is determined to intersect it.

The data structure 84 also comprises validity indicators 87 and opacity indicators 88 for each graphics primitive. The validity indicators 87 indicate whether entries in the data structure for the graphics primitive that the validity indicator corresponds to are currently being validly used to store data for a graphics primitive (it will be appreciated that in some cases the data structure may be used to store fewer than three graphics primitives). The opacity indicators indicate whether a graphics primitive is opaque (and so are used to determine what further processing is required for a ray).

Figure 10A:
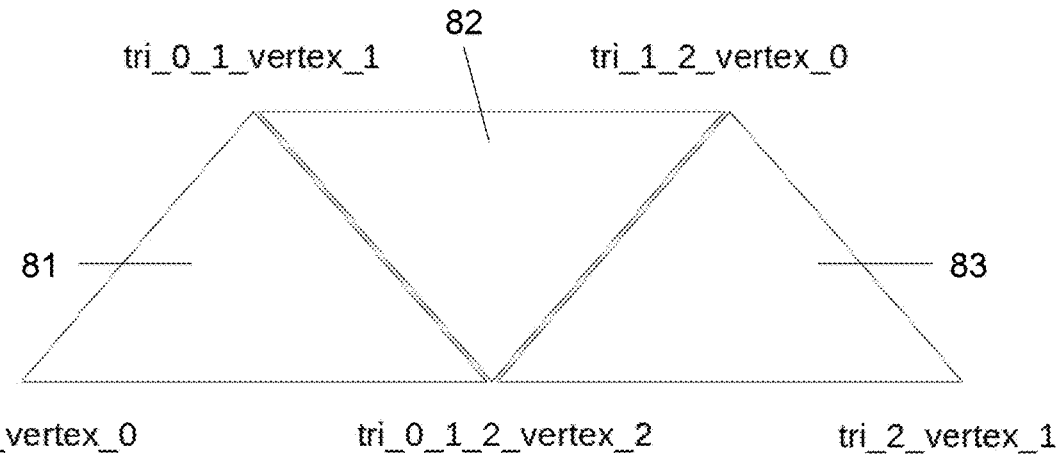
FIG. 10A and FIG. 10B show an arrangement for storing graphics primitives in the manner of the technology described herein.
Figure 10B:

FIGS. 10A and 10B show another arrangement for storing three graphics primitives, which is in the manner of the technology described herein.

The graphics primitives 91, 92, 93 in FIG. 10A are arranged in the same contiguous manner as the graphics primitives of FIG. 9A. Accordingly, the positions of some of the vertices of the graphics primitives are common for more than one of the graphics primitives (such as the second vertex of the first graphics primitive 81 and the second vertex of the second graphics primitive 82 (tri_0_1_vertex_1)).

In the data structure 94 of FIG. 10B, the vertex data 95 for the graphics primitives 81, 82, 83 is stored without duplicating the vertex data for the shared vertices. Accordingly, one line in the data structure 94 stores vertex data 95 that will be used for multiple graphics primitives. For example, one line stores tri_0_1_vertex_1_x, which is the vertex position in the x position that can be (and is) used for that shared vertex for both the first graphics primitive and the second graphics primitive.

In this way, the number of lines of the data structure required to store vertex data is reduced.

Furthermore, it is arranged that each of the graphics primitives 81, 82, 83 requires the same geometry indication 96 (for example, that graphics primitives are only included in the data structure 94 if they have a common geometry indication). In this case, a single geometry indication 96 is used with respect to each of the graphics primitives stored in the data structure, as opposed to storing one geometry indication per graphics primitive as done in the data structure of FIG. 8B.

The data structure of FIG. 10B also has entries for storing opacity and validity indicators for each graphics primitive that it can store, in the same manner as the data structure of FIG. 9B.

In total, this allows the data structure of FIG. 10B to store data for three contiguous graphics primitives in only 16 lines (and therefore the data structure comprises 64 bytes of data), rather than the 32 lines (and therefore 128 bytes of data) required for the data structure of FIG. 9B to store the same graphics primitives.

Figure 11:
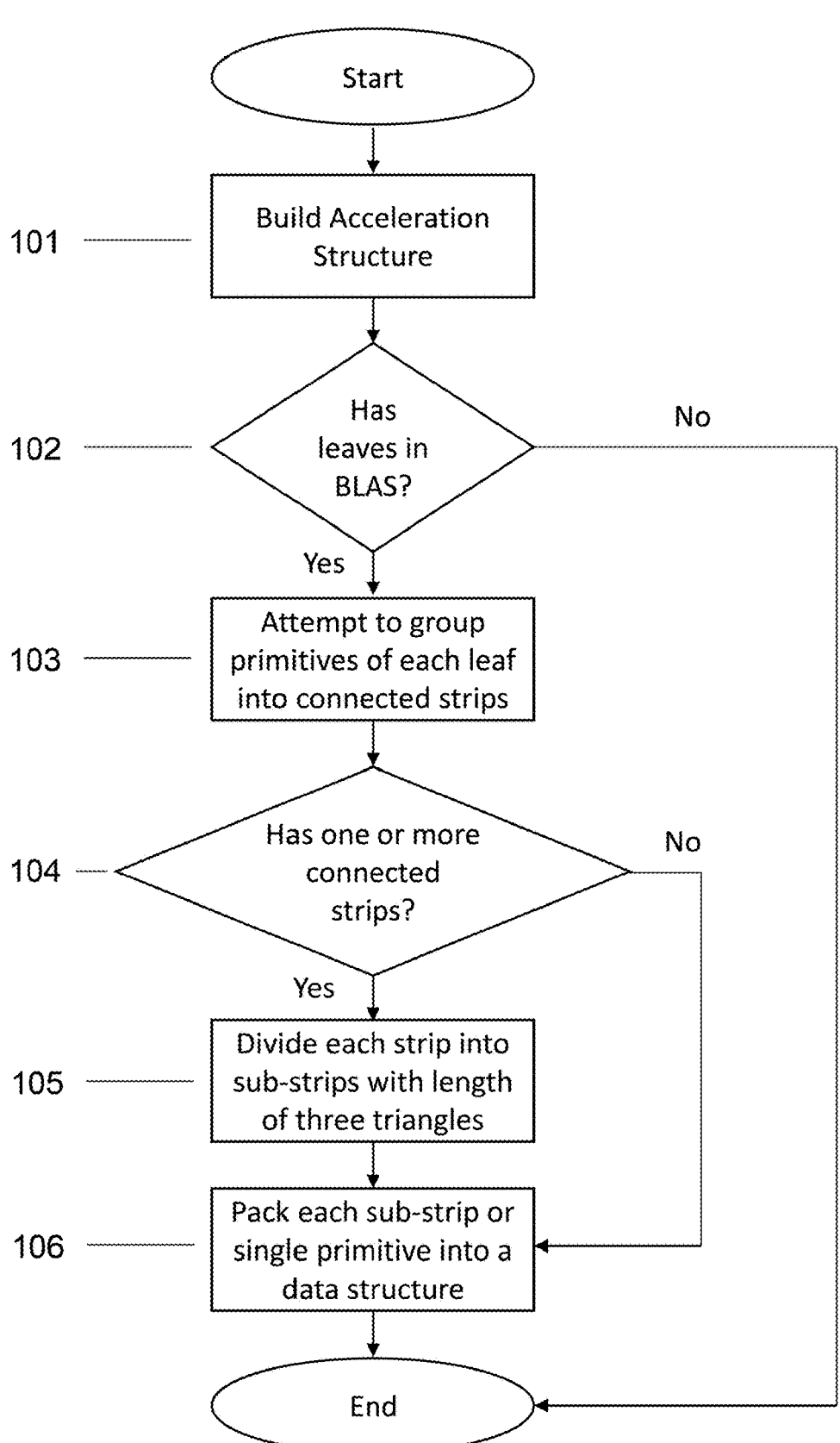
FIG. 11 is a flow chart showing in more detail embodiments of storing of data for a ray tracing acceleration data structure.

FIG. 11 is a flow chart showing in more detail embodiments of storing of data for a ray tracing acceleration data structure.

First, the geometry of the scene is analysed and used to construct an acceleration data structure (step 101), for example in the form of one or more BVH tree structures, as discussed above. This can be done in any suitable and desired manner, for example by means of an initial processing pass on the graphics processor 2.

For any BLAS (as described above), it is then determined whether said BLAS contains leaf nodes (step 102). If the BLAS does not comprise any leaves then the process ends, and if more than one BLAS are constructed for the scene, then the process starts again for the next acceleration data structure.

If the BLAS does contain leaf nodes, then for each leaf node, it is attempted to group the graphics primitives for that leaf node into one or more connected strips (step 103), where graphics primitives in the connected strips are contiguous, such that each graphics primitive in the connected strip shares at least one vertex in common with another graphics primitive in the connected strip. In this embodiment, graphics primitives are only added to the connected strip if they share a common edge. This can be done in any suitable and desired way.

Figure 12:
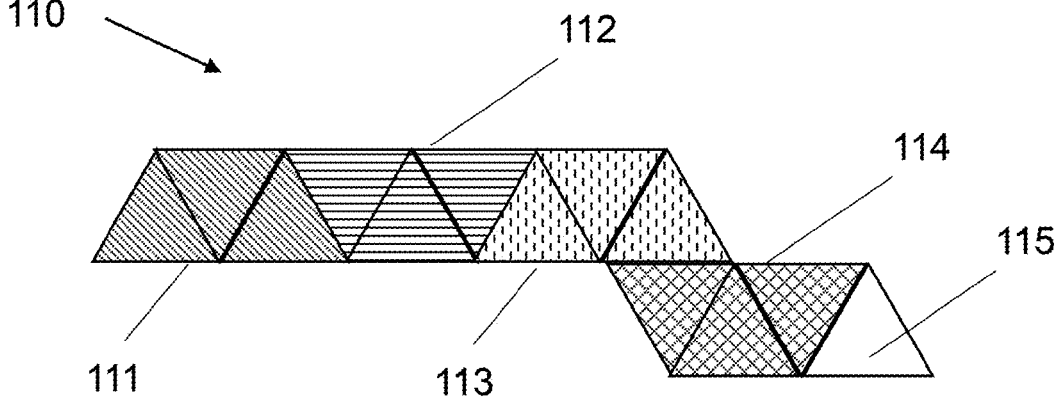
FIG. 12 shows schematically a contiguous strip of graphics primitives.

FIG. 12 shows such a connected strip of graphics primitives 110. In FIG. 12, each graphics primitive in the connected strip 110 shares an edge with either one or two other graphics primitives in the connected strip 110, and therefore is contiguous therewith. It will be appreciated that in this case, where graphics primitives are triangles, it is possible for a graphics primitive to share edges with three other graphics primitives for the leaf node. However, in this embodiment only two such primitives are included in any connected strip.

Any graphics primitives that cannot be grouped into a connected strip, for example because they are not contiguous with another graphics primitive for the leaf node, can be stored in any suitable and desired way. For example, they may be treated as single graphics primitives, that can otherwise be stored in the same way as the connected strips, as discussed below.

Once it has been attempted to group graphics primitives for the leaf node into one or more connected strips, it is then determined whether this grouping has generated any connected strips (step 104).

For any connected strips for the leaf node, the connected strip is divided where possible into sub-strips containing three graphics primitives (step 105). This may be done in any suitable and desired way.

If a connected strip does not comprise a multiple of three graphics primitives, then the strip is sub-divided into sub-strips containing three graphics primitives until there are fewer than three graphics primitives remaining, where the remaining graphics primitive(s) is then either a single graphics primitive or a smaller sub-strip of two graphics primitives.

For example, in the connected strip 110 shown in FIG. 12, there are 13 graphics primitives. The connected strip 110 is divided into a four sub-strips (111, 112, 113, 114), each containing three graphics primitives, and a single graphics primitive 115 that is left over.

Vertex data for the graphics primitives of each of the sub-strips is then stored in one of the data structures of FIG. 10B (step 106).

If no connected strips are present, then any single graphics primitives for the leaf node (e.g. single graphics primitives that are not connected to any other graphics primitives for the leaf node) are packed into data structures. These single primitives may be stored in a corresponding one of the data structure of FIG. 10B. Alternatively, one or more such single graphics primitives may be stored in the data structure(s) of FIG. 9B.

With reference to FIG. 8, when determining whether a ray intersects any of the graphics primitives (step 432), a vertex position is required for each vertex of each graphics primitive, such that it can be determined whether a ray intersects with that graphics primitive.

When the graphics primitives are stored in the data structure(s) 94 of FIG. 10B, when determining whether a ray intersects the graphics primitives 81, 82, 83 stored in the data structure 94, some lines of (entries for) vertex data 95 (corresponding to vertices that are shared by more than one of the graphics primitives), are used for more than one of the graphics primitives 81, 82, 83.

For example, tri_0_1_vertex_1_x is used as the x position for a vertex of both the first graphics primitive 81, and the second graphics primitive 82.

Figures 13A, 13B:
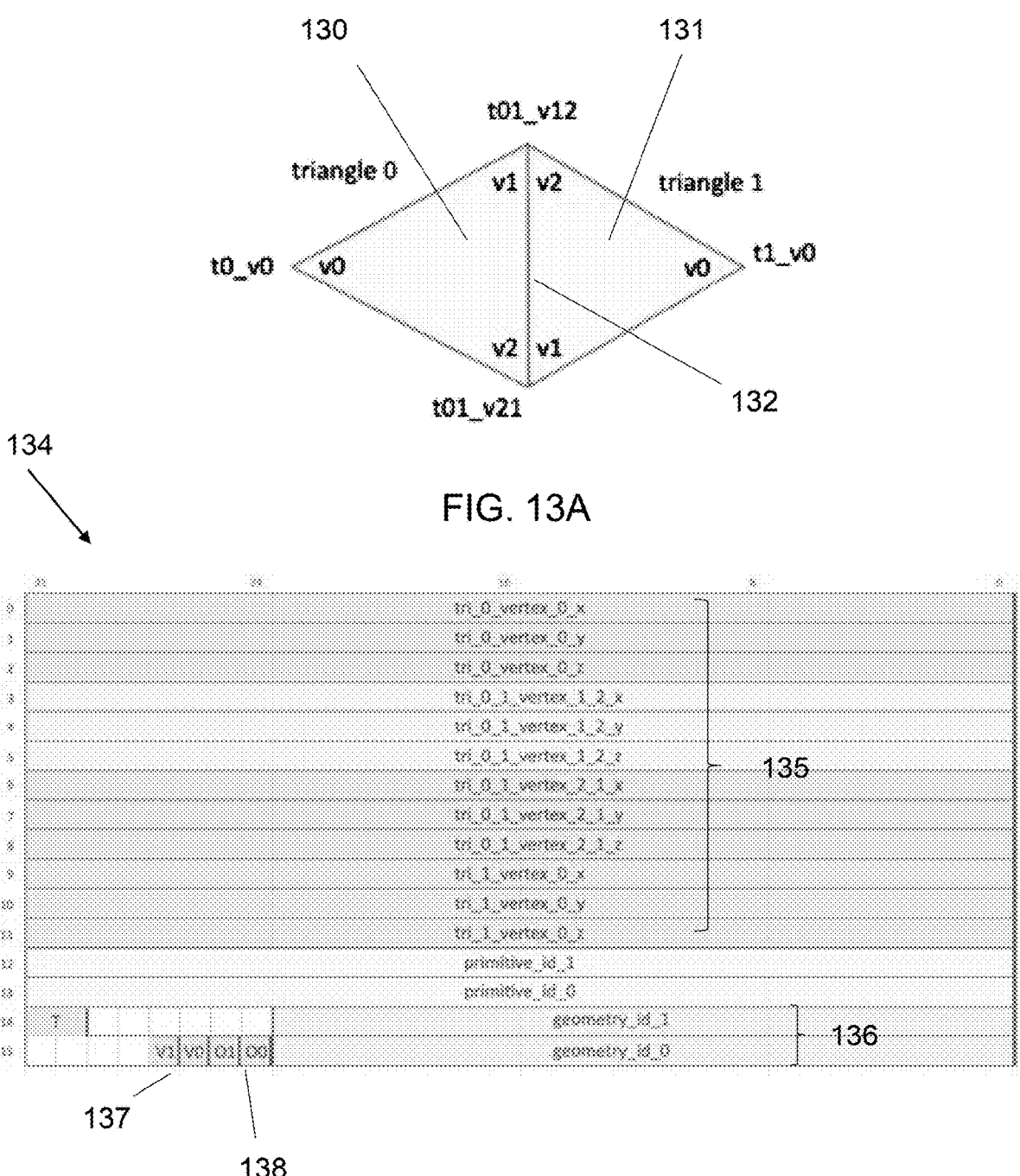
FIG. 13A and FIG. 13B show another arrangement for storing graphics primitives in the manner of the technology described herein.

FIGS. 13A and 13B show an arrangement for storing two contiguous graphics primitives, which is in the manner of the technology described herein.

In FIG. 13A, two contiguous graphics primitives (130, 131) share one common edge 132, and therefore two common vertices (t01_v12 and t01_v21), where a vertex of a first of the graphics primitives 130 and a vertex of a second of the graphics primitives 131, have a common vertex position.

FIG. 13B shows a data structure for storing the two contiguous graphics primitives of FIG. 13A. Like the data structure of FIG. 10B, the data structure 134 of FIG. 13B contains only enough entries for storing vertex data 135 to store the unique vertex positions for the two contiguous graphics primitives (130, 131). Accordingly, some lines in the data structure 134 store vertex data 135 that will be used for both of the graphics primitives (130, 131).

In this embodiment, a separate geometry indication 136 is stored for each of the two graphics primitives (130, 131), in the same manner as the data structure of FIG. 9B.

The data structure of FIG. 13B also has entries for storing opacity indicators 138 and validity indicators 137 for each graphics primitive that it can store, in the same manner as the data structure of FIG. 9B.

The data structure of FIG. 13B is the same size as the data structure of FIG. 10B to store one fewer primitive. However, this arrangement may occur more frequently in many scenes, and therefore may lead to fewer partially filled data structures.

Figure 14:
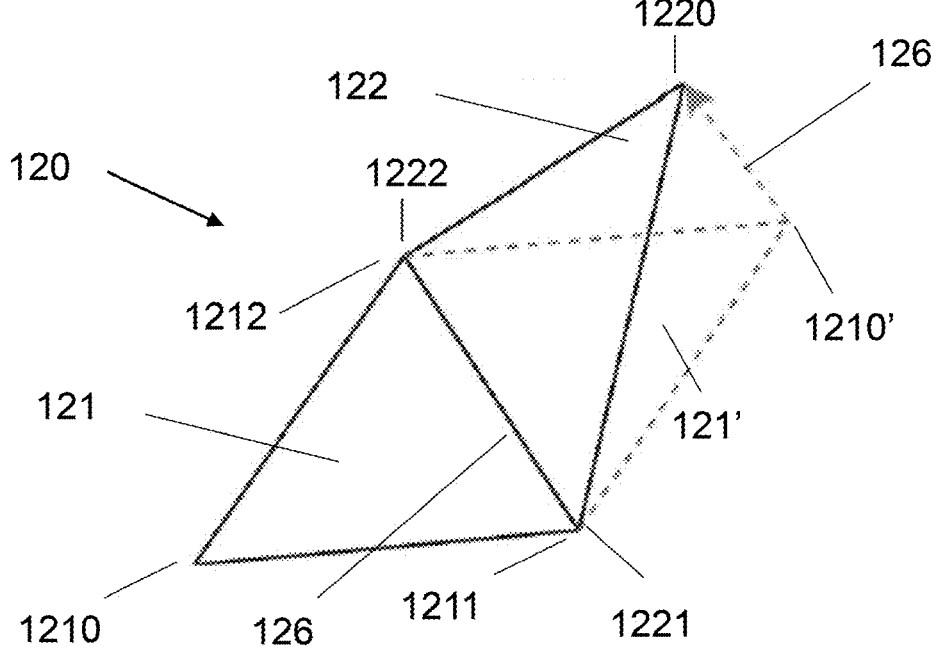
FIG. 14 shows yet another alternative arrangement for storing two graphics primitives.

FIG. 14 shows an alternative arrangement for storing two graphics primitives. In this embodiment, pairs of contiguous graphics primitives 120 that share an edge 125 are identified, comprising a first graphics primitive 121 and a second graphics primitive 122. The vertex positions are stored for the first graphics primitive 121. It will be appreciated that two of the vertex positions for the second graphics primitive (1221, 1222) are the same as for the first graphics primitive (1211 and 1212 respectively). Accordingly, data entries for these vertices may be common between the vertices of the first 121 and second 122 graphics primitives, as described for the arrangement FIGS. 13A and 13B.

In this embodiment, instead of storing a position for the final vertex 1220 of the second graphics primitive 122, the first graphics primitive 121 is mirrored along the shared edge 125. The vertex position 1210' of the mirrored first graphics primitive 121' is determined, as is the difference in graphics positions between this mirrored vertex 1210' and the actual position of the final vertex 1220 of the second graphics primitive 122.

Only this correction is stored with respect to the final vertex 1220 of the second graphics primitive 122, rather than storing the vertex position of the final vertex 1220. As such a mirrored vertex 1210' is likely to be located close to the final vertex 1220 (on a global scale), such a correction is likely to be much smaller, and therefore may be stored using less data, than the (true) vertex position for the vertex 1220.

It can be seen from the above that the technology described herein, in its embodiments at least, can provide a more efficient process for storing vertex data for a ray-tracing acceleration data structure. This is achieved, in the embodiments of the technology described herein at least, by sorting the graphics primitives into groups of contiguous graphics primitives, and for a vertex of a group of contiguous graphics primitives that is shared by at least two graphics primitives of the group of contiguous graphics primitives, storing fewer instances of the vertex data for the shared vertex than the number of graphics primitives in the group of contiguous graphics primitives that share the vertex.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of storing geometry data for use by a graphics processor when rendering a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

the method comprising, when preparing the ray tracing acceleration data structure for use when rendering the frame that represents the view of the scene using the ray tracing process:

for a set of graphics primitives that an end point of the ray tracing acceleration data structure represents:

storing vertex data for the set of graphics primitives for the end point, wherein storing vertex data for the set of graphics primitives for the end point comprises:

sorting the set of graphics primitives for the end point to identify groups of contiguous graphics primitives; and for one or more identified groups of contiguous graphics primitives, for a vertex of an identified group of contiguous graphics primitives that is shared by at least two graphics primitives of the identified group of contiguous graphics primitives, storing fewer instances of the vertex data for the shared vertex than the number of graphics primitives in the identified group of contiguous graphics primitives that share the vertex; and when the identified group of contiguous graphics primitives comprises more than a particular maximum number of graphics primitives:

sub-dividing the identified group of contiguous graphics primitives into two or more subsets of contiguous graphics primitives comprising up to the particular maximum number of graphics primitives; and storing the subsets of contiguous graphics primitives in data structures configured to receive the particular maximum number of graphics primitives.

2. The method of claim 1, wherein sorting the set of graphics primitives for an end point into zero or more groups of contiguous graphics primitives comprises, for an unallocated first primitive of the set of graphics primitives:

determining whether there is an unallocated second graphics primitive of the set of graphics primitives that shares at least one vertex with the first graphics primitive, and if so, forming a group of contiguous graphics primitives comprising the first graphics primitive and the second graphics primitive.

3. The method of claim 2, wherein sorting the set of graphics primitives for an end point into groups of contiguous graphics primitives further comprises:

determining whether there is an unallocated third graphics primitives of the set of graphics primitives that shares a vertex with the second graphics primitive, and if so, allocating the third graphics primitive to the group of contiguous graphics primitives; and continuing to determine whether there is an unallocated next graphics primitive of the set of graphics primitives that shares a vertex with a graphics primitive most recently added to the group of contiguous graphics primitives, and if so, allocating the next graphics primitive to the group of contiguous graphics primitives.

4. The method of claim 1, wherein the particular maximum number of graphics primitives is two or three.

5. The method of claim 1, wherein storing vertex data for a set of graphics primitives for an end point comprises storing vertex data for only graphics primitives having the same geometry indication in any one data structure.

6. The method of claim 1, comprising storing a single instance of vertex data for each vertex in the subset of the contiguous graphics primitives that is shared by more than one graphics primitive in the subset of contiguous graphics primitives.

7. The method of claim 1, wherein storing vertex data for a set of graphics primitives for an end point further comprises, for at least one graphics primitive of the set of graphics primitives, storing the at least one graphics primitive in an alternative data structure, configured to store one instance of vertex data per vertex of the graphics primitives stored in the alternative data structure.

8. A method of using geometry data by a graphics processor when rendering a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

the method comprising, when using a ray tracing acceleration data structure when rendering a frame that represents a view of a scene using the ray tracing process:

fetching vertex data for a set of graphics primitives for an end point of the ray tracing acceleration data structure; and using the vertex data when testing rays for intersection with the ray tracing acceleration data structure to determine geometry for the scene to be rendered that may be intersected by the rays;

wherein, when fewer instances of the vertex information have been stored for a vertex that is shared by at least two contiguous graphics primitives than the number of graphics primitives that share the vertex, using the vertex data when testing rays for intersection with the ray tracing acceleration data structure to determine geometry for the scene to be rendered that may be intersected by the rays comprises using the same instance of the vertex data that is stored for the end point for the shared vertex for more than one of the contiguous graphics primitives that share the vertex;

wherein using the same instance of the vertex data as stored for the end point for the shared vertex for more than one of the contiguous graphics primitives that share the vertex comprises using vertex data stored in a particular entry of a data structure with respect to more than one of the contiguous graphics primitives that share the vertex.

9. A method of using geometry data by a graphics processor when rendering a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

the method comprising, when using the ray tracing acceleration data structure when rendering the frame that represents the view of the scene using the ray tracing process:

fetching vertex data for a set of graphics primitives for an end point of the ray tracing acceleration data structure; and using the vertex data when testing rays for intersection with the ray tracing acceleration data structure to determine geometry for the scene to be rendered that may be intersected by the rays;

wherein, when fewer instances of the vertex information have been stored for a vertex that is shared by at least two contiguous graphics primitives than the number of graphics primitives that share the vertex, using the vertex data when testing rays for intersection with the ray tracing acceleration data structure to determine geometry for the scene to be rendered that—may be intersected by the rays comprises using the same instance of the vertex data that is stored for the end point for the shared vertex for more than one of the contiguous graphics primitives that share the vertex;

wherein using the same instance of the vertex data as stored for the end point for the shared vertex for more than one of the contiguous graphics primitives that share the vertex comprises using vertex data stored in a particular entry of a data structure with respect to more than one of the contiguous graphics primitives that share the vertex.

10. The system of claim 9, wherein the processing circuit is configured to, when sorting the set of graphics primitives for an end point into zero or more groups of contiguous graphics primitives, for an unallocated first primitive of the set of graphics primitives:

determine whether there is an unallocated second graphics primitive of the set of graphics primitives that shares at least one vertex with the first primitive, and if so, form a group of contiguous graphics primitives comprising the first graphics primitive and the second graphics primitive.

11. The system of claim 10, wherein the processing circuit is configured to, when sorting the set of graphics primitives for an end point into zero or more groups of contiguous graphics primitives:

determine whether there is an unallocated third graphics primitives of the set of graphics primitives that shares a vertex with the second graphics primitive, and if so, allocate the third graphics primitive to the group of contiguous graphics primitives; and continue to determine whether there is an unallocated next graphics primitive of the set of graphics primitives that shares a vertex with a graphics primitive most recently added to the group of contiguous graphics primitives, and if so, allocate the next graphics primitive to the group of contiguous graphics primitives.

12. The system of claim 10, wherein the particular maximum number of graphics primitives is two or three.

13. The system of claim 10, wherein the processing circuit is configured to, when storing vertex data for a set of graphics primitives for an end point, store vertex data for only graphics primitives having the same geometry indication in any one data structure.

14. The system of claim 10, wherein the processor is configured to, when storing vertex data for the set of graphics primitives for the end point, store a single instance of vertex data for each vertex in the subset of the contiguous graphics primitives that is shared by more than one graphics primitive in the subset of contiguous graphics primitives.

15. The system of claim 9, wherein the processing circuit is configured to, when storing vertex data for a set of graphics primitives for an end point, for at least one graphics primitive of the set of graphics primitives, store the at least one graphics primitive in an alternative data structure, configured to store one instance of vertex data per vertex of the graphics primitives stored in the alternative data structure.

16. A graphics processor that is operable to render a frame that represents a view of a scene using a ray tracing process, wherein the ray tracing process uses a ray tracing acceleration data structure indicative of the distribution of geometry for the scene to be rendered to determine geometry for the scene that may be intersected by a ray being used for a ray tracing operation, the geometry of the scene represented by graphics primitives, wherein the ray tracing acceleration data structure includes at least some end points representing sets of graphics primitives defined for the scene that occupy a volume within the scene that the end point corresponds to;

wherein the graphics processor is configured to, when using a ray tracing acceleration data structure when rendering a frame that represents a view of a scene using the ray tracing process:

fetch vertex data for a set of graphics primitives for an end point of the ray tracing acceleration data structure; and use the vertex data when testing rays for intersection with the ray tracing acceleration data structure to determine geometry for the scene to be rendered that may be intersected by the rays;

wherein, when fewer instances of the vertex data have been stored for a vertex that is shared by at least two contiguous graphics primitives than the number of graphics primitives that share the vertex, using the vertex data when testing rays for intersection with the ray tracing acceleration data structure to determine geometry for the scene to be rendered that may be intersected by the rays comprises using the same instance of the vertex data that is stored for the end point for the shared vertex for more than one of the contiguous graphics primitives that share the vertex;

wherein the graphics processor is configured to, when using the same instance of the vertex data as stored for the end point for the shared vertex for more than one of the contiguous graphics primitives that share the vertex, use vertex data stored in a particular entry of a data structure with respect to more than one of the contiguous graphics primitives that share the vertex.

17. A non-transitory computer program product that when executed on a data processor causes the data processor to perform a method as claimed in claim 1.

42

\* \* \* \* \*